US011058950B2

(12) United States Patent
Azmandian et al.

(10) Patent No.: US 11,058,950 B2
(45) Date of Patent: Jul. 13, 2021

(54) METHODS AND SYSTEMS FOR SPECTATING CHARACTERS IN VIRTUAL REALITY VIEWS

(71) Applicant: Sony Interactive Entertainment Inc., Tokyo (JP)

(72) Inventors: Mahdi Azmandian, San Mateo, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/355,635

(22) Filed: Mar. 15, 2019

(65) Prior Publication Data
US 2020/0289934 A1    Sep. 17, 2020

(51) Int. Cl.
| | |
|---|---|
| *A63F 13/00* | (2014.01) |
| *A63F 13/5252* | (2014.01) |
| *A63F 13/5258* | (2014.01) |
| *A63F 13/86* | (2014.01) |
| *G06F 3/01* | (2006.01) |
| *G06F 3/0346* | (2013.01) |
| *G06F 3/0484* | (2013.01) |
| *H04L 29/06* | (2006.01) |

(52) U.S. Cl.
CPC ...... *A63F 13/5252* (2014.09); *A63F 13/5258* (2014.09); *A63F 13/86* (2014.09); *G06F 3/012* (2013.01); *G06F 3/013* (2013.01); *G06F 3/0346* (2013.01); *G06F 3/04845* (2013.01); *A63F 2300/577* (2013.01); *A63F 2300/6669* (2013.01); *A63F 2300/6684* (2013.01); *A63F 2300/8082* (2013.01); *G06F 2203/04805* (2013.01); *H04L 67/38* (2013.01)

(58) Field of Classification Search
None
See application file for complete search history.

(56) References Cited

U.S. PATENT DOCUMENTS 6,304,267 B1 * 10/2001 Sata ................... G06T 15/10
345/419
9,327,191 B2 * 5/2016 Miyamoto .......... A63F 13/5258
(Continued)

OTHER PUBLICATIONS

PCT/US2020/016665, International Search, European Patent Office, dated Jul. 3, 2020.
(Continued)

*Primary Examiner* — Paul A D'Agostino
(74) *Attorney, Agent, or Firm* — Penilla IP, APC

(57) ABSTRACT

Methods and systems for spectating a live video game are presented. In one method embodiment, an operation includes providing an interface for presenting an overhead view of an interactive environment of a video game on a head mounted display (HMD). The method also provides an operation for providing a magnifying window for displaying a magnified view of the interactive environment, where the magnified view is associated with a second vantage point that is closer to the interactive environment than is a first vantage point of the overhead view. The method further provides an operation for tracking a real-world position of a controller of the spectator and moving the location of the magnifying window to correspond to the real-world position of the controller.

9 Claims, 13 Drawing Sheets

(56) References Cited

U.S. PATENT DOCUMENTS

| | | | | |
|---|---|---|---|---|
| 2003/0210329 A1* | 11/2003 | Aagaard | ............ | H04N 5/23296 348/159 |
| 2006/0146132 A1* | 7/2006 | Mayerson | ............... | H04N 7/181 348/143 |
| 2007/0279494 A1* | 12/2007 | Aman | ................ | H04N 5/23238 348/169 |
| 2009/0290848 A1* | 11/2009 | Brown | ................... | H04N 5/247 386/223 |
| 2010/0151943 A1* | 6/2010 | Johnson | ................. | G07F 17/32 463/32 |
| 2014/0184801 A1* | 7/2014 | Choi | ................. | H04N 5/23238 348/158 |
| 2015/0130843 A1 | 5/2015 | Alfaro et al. | ............. | G06T 3/60 |
| 2016/0320951 A1* | 11/2016 | Ernst | .................... | G06K 9/4604 |
| 2017/0001118 A1* | 1/2017 | Ibrahim | ................ | A63F 13/828 |
| 2017/0266554 A1* | 9/2017 | Marks | ................. | A63F 13/5255 |
| 2017/0269685 A1* | 9/2017 | Marks | ................... | A63F 13/212 |
| 2017/0269713 A1* | 9/2017 | Marks | ................... | G06F 3/0346 |
| 2018/0359427 A1* | 12/2018 | Choi | ...................... | H04N 21/44 |
| 2020/0145623 A1* | 5/2020 | Sadanand | ............... | G06T 7/292 |

OTHER PUBLICATIONS

Nilsen, "*Tankwar—AR Games at GenCon Indy 2005*", ACM Intl Conf. Proc. Series, New York, NY, XP058167011, pp. 243-244, Dec. 5, 2005.

Nilsen et al., "*Tankwar—Tabletop war gaming in augmented reality*", Pergames 2005, $2^{nd}$ Intl Workshop on Gaming Applications in Pervasive Computing Environments, May 11, 2005, XP055690401, Munchen.

Ji-Young On et al., "*User evaluations on form factors of tangible magic lenses*", Mixed and Augmented Reality, 2006, ISMAR 2006. IEEE/ACM Intl Symp. On, IEEE, PI. XP058378959, ISBN: 978-1-4244-0650-0, Oct. 22, 2006.

Ji-Young Oh et al., "*Usability of Multi-Scale Interfaces for 3D Workbench Displays*", Presence, vol. 17, No. 5, Sep. 24, 2008, pp. 415-440, XP055689842, ISSN: 1054-7460.

\* cited by examiner

METHODS AND SYSTEMS FOR SPECTATING CHARACTERS IN VIRTUAL REALITY VIEWS

RELATED APPLICATION

This application is related to U.S. patent application Ser. No. 16/355,668, entitled "METHODS AND SYSTEMS FOR SPECTATING CHARACTERS IN FOLLOW-MODE FOR VIRTUAL REALITY VIEWS," filed Mar. 15, 2019, which is herein incorporated by reference.

FIELD OF THE DISCLOSURE

The present disclosure relates generally to virtual reality applications, and more particularly, to methods and systems for providing spectating views.

BACKGROUND

Virtual reality is becoming an increasingly popular way for consumers to interact with content. This is especially true in the context of video games. Currently, both players and spectators are able to interact with a video game in virtual reality via a head mounted display (HMD). A spectator is typically given a spectator view that is generated by introducing a camera within the environment of the game. The spectator may be able to navigate the environment of the video game via a controller to view the game action of the video game. For example, a spectator may choose to follow a certain player to view the performance of that player.

Current methods of spectating video games via HMD have certain drawbacks in terms of navigability, usability, comfort, and functionality. For example, currently it may be difficult for a spectator to navigate a game environment in a desired manner to view the various happenings that are of interest to the spectator. Additionally, it may be difficult for a spectator to follow a target player in a comfortable way.

It is in this context that embodiments arise.

SUMMARY

Embodiments of the present disclosure relate to methods and systems for enabling various spectator views of a live video game as well as for enabling a spectator to be transported between the various views.

In one embodiment, a method is provided. The method includes an operation for providing an interface for presenting an overhead view of an interactive environment of a video game on a head mounted display (HMD) of a spectator. The overhead view is associated with a first vantage point for showing one or more players within the interactive environment. Further, the method includes an operation for providing a magnifying window within the interface that covers a portion of the overhead view where the magnifying window displays a magnified view of the interactive environment depending on a location of the magnifying window within the interface. In these and other embodiments, the magnified view is associated with a second vantage point that is closer to the interactive environment than the first vantage point is. Moreover, the method provides an operation for tracking a real-world position of a controller held by the spectator and moving a location of the magnifying window within the interface to correspond to the real-world position of the controller. In certain embodiments, the method also includes an operation for detecting a selection by the spectator for entering into a player portal view of a player of the plurality of players to achieve a third-person view of the player, the player portal view is associated with a second vantage point. Additionally, certain embodiments, the method includes an operation for moving the second vantage point to a third vantage point that is closer to the player such that a virtual position of the spectator is brought closer to the player within the player portal view, while the view outside of the player portal view remains at the first vantage point. Further still, the method may include an operation for wiping away the player portal view during at least a portion of said moving the second vantage point for said achieving the third-person view, said wiping away the player portal view includes expanding a size of the player portal view such that the third-person view replaces the view in the interface.

In another embodiment, a method includes an operation for providing an interface for presenting a view of an interactive environment of a video game being played by a plurality of players, the interface being displayed on a client device to a spectator, wherein the view is associated with a first vantage point. The method also includes an operation for generating, in response to an input of the spectator, an interactable map view of the interactive environment. The interactable map view includes a map of the interactive environment, the map including a plurality of indicators indicating respective locations of the plurality of players within the environment. The interactable map view also includes a plurality of player portal views respective of each of the plurality of players. Further, the method includes an operation for displaying the interactable map view to the spectator via the client device, wherein the interactable map view enables the spectator to view the map of the interactive environment and the third-person views of each of the plurality of players concurrently.

In another embodiment a non-transitory computer-readable storage medium storing a computer program executable by a processor-based system is provided. The non-transitory computer-readable storage medium includes program instructions for providing an interface for presenting an overhead view of an interactive environment of a video game on a head mounted display (HMD) of a spectator, the overhead view is associated with a first vantage point for showing one or more players within the interactive environment. The non-transitory computer-readable storage medium also includes program instructions for providing a magnifying window within the interface that covers a portion of the overhead view, the magnifying window displays a magnified view of the interactive environment depending on a location of the magnifying window within the interface, the magnified view is associated with a second vantage point that is closer to the interactive environment than the first vantage point is. The non-transitory computer-readable storage medium further includes program instructions for detecting a selection by the spectator for entering a third-person view of a player, the third-person view is associated with a third vantage point that is closer to the player than the first vantage point or the second vantage point. Additionally, the non-transitory computer-readable storage medium includes program instructions for processing a music track to identify markers for the music track that correspond to musical signatures associated with the music track. The non-transitory computer-readable storage medium moreover includes program instructions for moving the second vantage point of the magnifying window to the third vantage point such that a virtual position of the spectator is brought closer to the player within the magnifying window, while the overhead view remains at the first vantage point outside the magnifying window. Further still, the non-transitory computer-readable storage medium includes program instructions for wiping away the magnifying window during at least a portion of said moving the second vantage point, said wiping away the magnifying window includes expanding a size of the magnifying window such that the third-person view replaces the overhead view in the interface.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
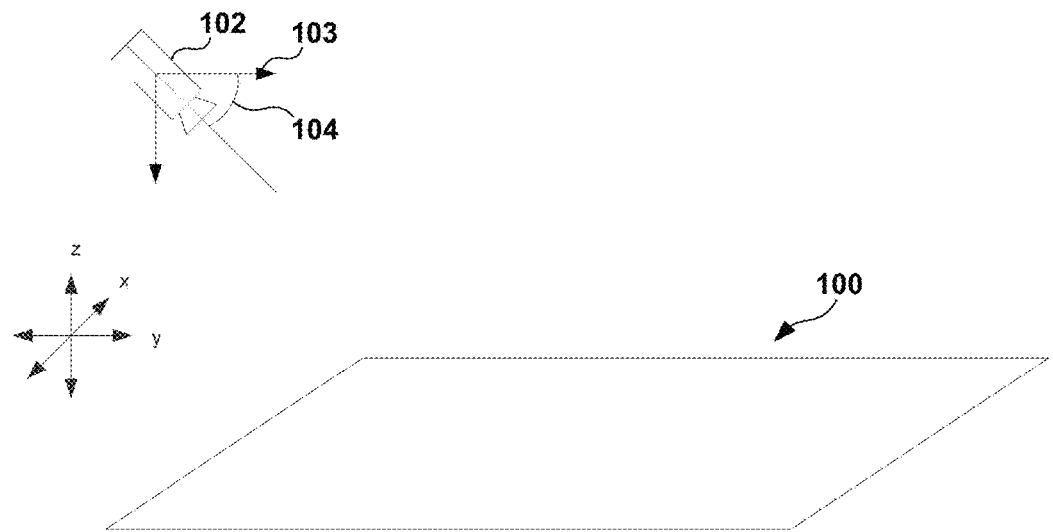
FIG. 1A shows a conceptual diagram of a camera placement used to capture an overhead view, according to one embodiment.

Embodiments of the present disclosure relate to improved methods and systems for spectating video games. Some embodiments of the present disclosure relate to methods of providing seamless transitions between an overhead view of an interactive space of a wide area video game to a third-person view of a player. Additionally, embodiments of the present disclosure relate to methods for seamlessly transitioning between a map view of the interactive environment to third-person views of players. In some embodiments, the methods can be implemented via one or more head mounted displays (HMDs). It will be obvious, however, to one skilled in the art, that the present disclosure may be practiced without some or all of these specific details. In other instances, well known process operations have not been described in detail in order to not unnecessarily obscure the present disclosure.

Video game spectating is an important component in the video game ecosystem and provides users with an opportunity to derive entertainment from a video game without having to play it. Just as spectating a sports game, a race, or a concert is entertaining for spectators, the same is true of video games. A video game need not be played first-hand to be a source of entertainment, just as a bobsledding race need not be raced first-hand to be a source of entertainment. Video games, however, can offer a spectating experience that is more immersive, engaging, and customized than that of other activities. Because video game action takes place in a virtual interactive environment, virtual cameras that capture spectator views are not limited in the ways real-life cameras are when capturing real-life action. For example, real-life cameras for capturing real-life spectating activities are limited by the costs of camera equipment, camera operation and broadcast, as well the impracticability of placing cameras at various areas on interest.

Spectating video games are confined by none of these. For example, it is possible to introduce cameras at virtually any location within a virtual interactive environment and to move them in a desired way to provide immersive and user-controlled spectator views. For example, it is possible to obtain overhead or top-down views for spectating the overall happenings of a video game by placing a virtual camera at an elevated position above the virtual interactive environment. It is also possible to obtain third-person views and over-the-shoulder views that are relatively close to a selected player to see in greater detail that player's actions. Moreover, it is possible to enable a spectator to control a virtual camera used to generate a spectator view, such as to move a camera location or to pan the camera.

However, while a greater number of views are possible with video game spectating, current methods are lacking in the way they manage the greater number of views as well as how comfortable the spectating experience is within a virtual reality setting. For example, current methods do not provide ways to seamlessly transition between various viewpoints, such as between an overhead view and a third-person view. Current methods transport a spectator within a virtual environment by providing translational movement to a virtual camera used to capture the spectator view. However, such movements can be disorienting and hard to follow, especially when the view is supplied to a VR view in an HMD. It has been observed that when spectators are moved translationally or rotationally within a VR scene without a sense of agency over the movement, disorientation may result.

Current methods also do not address a way to allow a spectator to automatically catch-up or follow a player of interest. For example, current methods either require a spectator to manually follow a player or provide fixed views that follow a player. The former method can become tiring and distracting for a spectator, especially during complex multiplayer games sessions of extended length. The latter method has been observed to cause disorientation because of herky-jerky nature of the fixed spectator view and translational and rotational movements imparted on the spectator view without an attendant sense of agency. The embodiments contemplated here address these and other shortcomings associated with current video game spectating technology.

Embodiments described here solve current problems related to spectator viewing technology in the computer-related arts by providing computer-implemented features of portal-mediated transitions between various spectator vantage points. Portal-mediated transitions or transport are used to support transitions between various vantage points (e.g., between an overhead view and a third-person view). Portal-mediated transitions are contemplated to be used when a vantage point of a spectator is to be moved such that the spectator experiences translational and rotational movements via a portal rather than experiencing the translational and rotational movement in a full field of view. The portal-mediated transitions include providing a portal that initially appears larger in size and constricts to a smaller size to restrict the spectator's field of view. The spectator's vantage point is then provided with translational and rotational movement to a desired destination within the portal while the area outside of the portal remains relatively static. In this manner, the spectator is made to focus on the area within the HMD display where movement occurs while the spectator's peripheral vision is not stimulated by movement. Portal-mediated transitions have been observed to result in more comfortable virtual movements with less disorientation for HMD spectators.

Figure 1B:
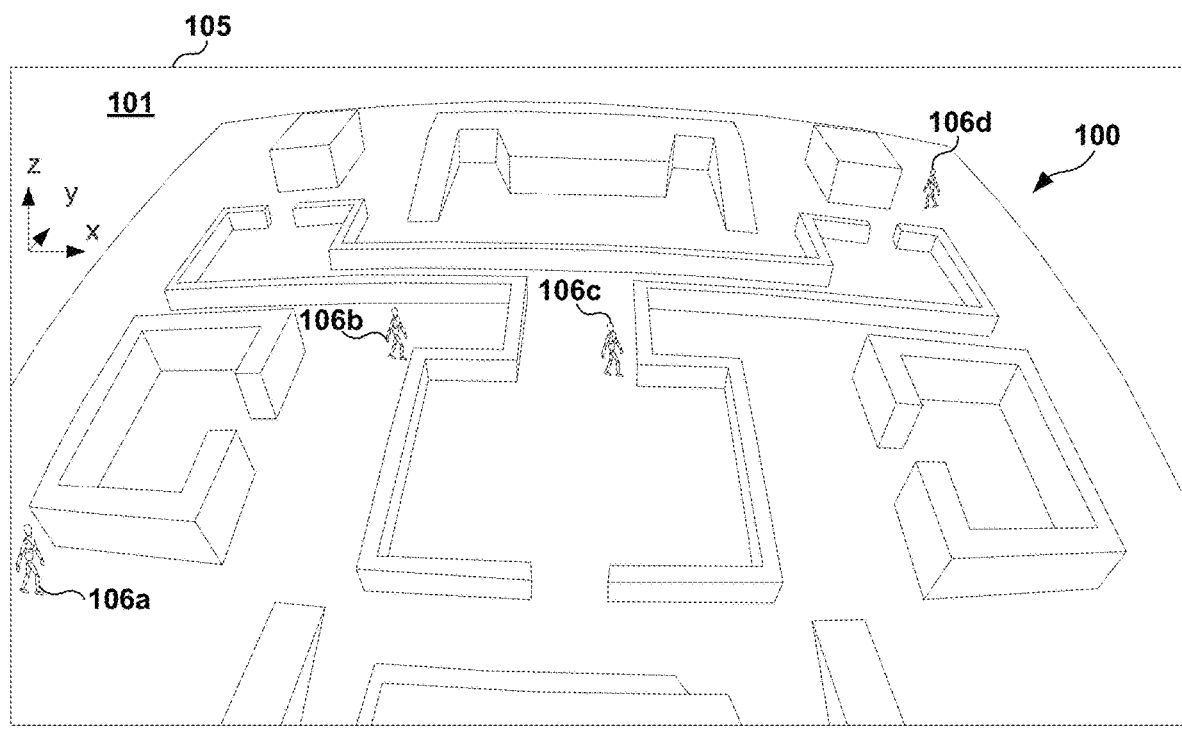
FIG. 1B shows an illustration of an overhead view of an interactive environment of a video game being played by a plurality of players, according to one embodiment.

FIG. 1A shows a conceptual diagram of a camera 102 used to capture an overhead view 101 shown in FIG. 1B, according to one embodiment. The camera 102 is placed at an elevated altitude in the z-axis to capture overall game action occurring in an interactive environment 100 of a video game. The video game may be of any genre, such as but not limited to a first-person shooter, a role-playing game, a fighting game, an action-adventure game, a racing game, a sports game, a turn-based game, a strategy game, a multiplayer online battle arena (MOBA), a massively multiplayer online role-playing game (MMORPG), a mobile game, and the like. The interactive environment includes the associated game environment in which players of the video game interact with each other and with game objects. While many games feature a generally flat interactive environment 100, other games have interactive environments that are multi-level or of varied topology. The interactive environment 100 of FIG. 1A is shown to be planar for the sake of clarity, although other map topologies are contemplated.

The camera 102 may be elevated to such an altitude that a wide-angle view of the interactive environment 100 is achieved. As such, the altitude, or z-coordinate of the camera 102 used for capturing an overhead view will depend upon the video game and the size of the interactive environment 100. For a smaller interactive environment 100, the z-coordinate may be around 10 meters or less, while for a large interactive environment, the z-coordinate may be 100 meters or greater. The camera 102 is also angled at pitch 104 between 0° and −90° relative to the horizon 103 to capture the interactive environment 100 at a favorable angle. Additionally, because the overhead view is contemplated to be displayed as a VR scene within an HMD where the pitch 104 corresponds to spectator's real-world head pitch, the pitch 104 need not be vertical as to not strain the neck and head of the spectator.

FIG. 1B shows an illustration of an interface 105 having an overhead view 101 of an interactive environment 100 of a video game generated by camera 102 of FIG. 1A, according to one embodiment. The actions of a plurality of players 106a-d are captured in overhead view 101 to provide an overview of the general happenings of the interactive environment 100. For example, a spectator may choose to use the overhead view 101 to gain overall knowledge of the video game, such as where each of players 106a-d are positioned and where they are moving, which of players 106a-d are still active in the video game and which are eliminated, etc. However, the overhead view 101 may be less effective at conveying detailed game actions of the interactive environment 100 because the spectator is positioned relatively far away from individual players of the plurality of players 106a-d.

The overhead view 101 shown in FIG. 1B may be displayed in a virtual reality environment provided by an HMD such that the interactive environment 100 and players 106a-d there interacting appear to the spectator in 3D. Additionally, various camera effects may be utilized to achieve desired display effects. For example, the overhead view 101 appears as a wide-angle, or "fisheye," or hemispherical view for purposes of capturing a wider field of the interactive environment 100. In this manner, more of the interactive environment 100 is shown within a given frame of view. Additionally, the spectator is not required to rotate his or her head very much to view different regions of the interactive environment 100.

Figure 2A:
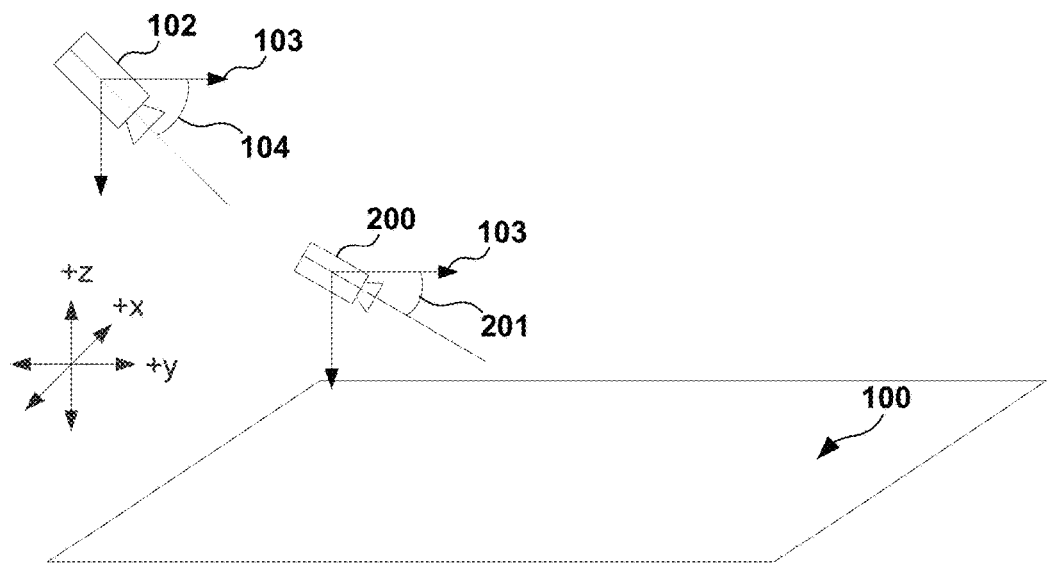
FIG. 2A shows a conceptual diagram of camera placement relative to an interactive environment of a video game for generating a magnified view of the interactive environment, according to one embodiment.

FIG. 2A shows a conceptual diagram for placing overhead view camera 102 and magnified view camera 200 for generating a magnified view 204 of the interactive environment 100, according to one embodiment. As noted above, the overhead view 101 is effective at communicating the general state of affairs of a video game but may be less so at communicating detailed events of the interactive environment 100. The magnified view 204 shown in FIG. 2B and captured by camera 200 is contemplated to augment the spectator's overhead view 101 by providing a magnified or closer-up view of a particular region of the interactive environment 100. The magnified view 204 is capable of conveying greater details of certain types of game action than the overhead view 204 is, enabling the spectator to simultaneously observe selected detailed game action along with the general state of affairs of the interactive environment 100.

FIG. 2A shows one embodiment used to generate a magnified view 204 within an overhead view 101. The overhead view camera 102 is positioned similarly as it is in FIG. 1A. To capture the magnified view 204, an additional camera 200 is executed within the video game program at a vantage point that is closer to the interactive environment 100 than is camera 102. Generally, the vantage point of camera 200 is to be less altitudinally elevated than camera 102 (e.g., the z-coordinate of camera 200 is less than that of camera 102). Moreover, the vantage point of camera 200 may be more centered over the interactive environment 100. For example, the vantage point of camera 200 may have a greater y-coordinate than camera 102. It is contemplated that camera 200 is to be more proximal to a selected magnified region in one, two, or three of the coordinate axes. Thus, the vantage point of camera 200 provides what appears to be a "magnified view" relative to the overhead view 101 because objects appear larger and closer relative to how they appear in the overhead view 101. As a result, finer, more granular visual details of game action may be discerned from the magnified view 204 captured by camera 200.

In certain embodiments, the vantage point of camera 200 may be controlled by a spectator via a controller. For example, in some embodiments, a spectator may move the vantage point of camera 200 by moving a handheld controller whose position in the real-world space is tracked. In this manner, the spectator may obtain a magnified view 204 of various regions of the interactive environment 100 by moving the controller.

In various embodiments, a pitch 201 of camera 200 may be at an angle that is the same as or different from the pitch 104 of camera 102. For example, FIG. 2A shows that the pitch 201 is less angled from the horizon 103 than pitch 104. In some embodiments, it is contemplated that pitch 201 may be adjusted in real-time by the spectator via the handheld controller. For example, if the spectator is able to move a vantage point of camera 200 by moving the controller translationally, the spectator may be able to change the pitch 201 by rotating the controller. In other embodiments, the pitch 201 of camera 200 may be similar to pitch 204 of camera 102 by default until it is adjusted by the spectator. In other embodiments, it is contemplated that the difference between the vantage points of camera 102 and camera 200 may be only positional and not rotational. In these embodiments, pitch 104 will match pitch 201 while the spectator views and manipulates the magnifying window 202.

Figure 2B:
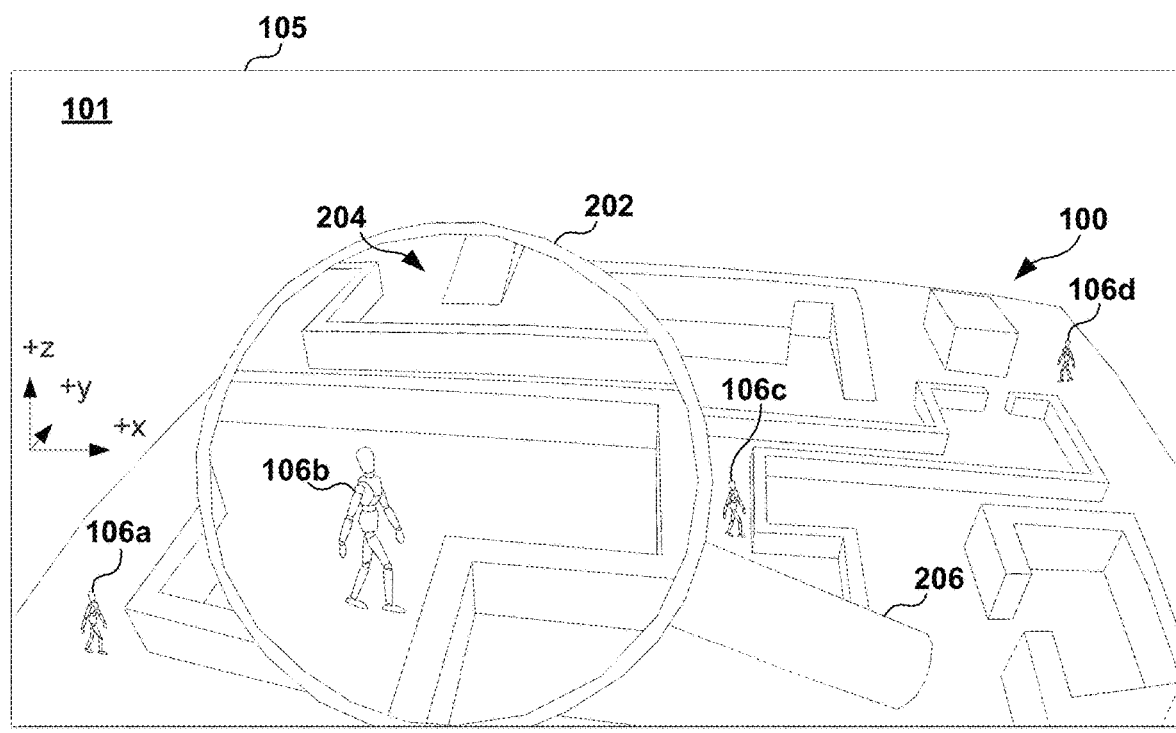
FIG. 2B shows an illustration of a magnified view displayed within a magnifying window, which is displayed within an overhead view of an interactive environment of a video game, according to one embodiment.

FIG. 2B shows an illustration of an interface 105 having a magnified view 204 displayed within a magnifying window 202, which displayed within an overhead view 101, according to one embodiment. The magnified view 204 is one that may be generated by camera 200 while the overhead view 101 may be generated by camera 102 of FIG. 2A. The magnified view 204 displays a region of interactive environment 100 such that it appears to the spectator that a region of the overhead view 101 is being magnified by a magnifying glass. The magnified view 204 may have a "magnification factor" of between about 1.1× to about 100×, or between about 1.5× to about 10×, or between about 2× to about 5×. The "magnification factor" will depend upon the vantage point of camera 200. In the embodiment shown in FIG. 2B, for example, player 106b appears two or three times as larger within the magnified view 204 as it does within the overhead view 101 of FIG. 1B.

The magnified view 204 is displayed within a magnifying window 202, which, in the embodiment shown, is a virtual magnifying glass. The magnifying glass is a user interface element that may be moved by the spectator via the controller. When the spectator moves the controller translationally, the translational movement is tracked, processed, and mapped in at least two ways. First, the translational movement is mapped to a translational movement of camera 200. As a result of this mapping, a different region of the interactive environment 100 is magnified for the magnified view 204. If the magnifying window 202 does not experience a corresponding translational movement within the interface 105, the region of the interactive environment 100 that is displayed within the magnifying window 202 would not correlate to the position of the magnifying window 202 within the interface 105. For example, if the magnifying window 202 is near a central position of the interface 105 but displays a magnified view of a far-right corner of the interactive environment 100, such a scenario would be confusing and hard to follow for the spectator. As a result, it is contemplated that the any translational movement experienced by camera 200 is accompanied by a proportional translational movement of the magnifying window 202. In this manner, the spectator will interact with the magnifying window 202 as if it were a virtual magnifying glass. The magnifying window 202 is shown to be associated with a handle 206 to add to this experience.

In certain embodiments, camera 200 captures video frames that are cropped to fit the size of the magnifying window 202. For example, if the video frames are not cropped, they could fit and fill the interface 105.

In certain embodiments, the magnified view 204 may also be accompanied by audio generated by the location of interactive interface 100 that is being magnified by the magnifying window 202. For example, if each of players 106a-106d are making sounds, the sound of player 106b may be selectively transmitted or amplified to the spectator. Meanwhile, the sounds of players 106a, 106c, and 106d may be reduced or not selectively transmitted to the spectator. If the spectator were then to move the magnifying window 202 to magnify player 106c, for example, the sound of player 106c would then be selectively transmitted while that of player 106b would cease to be transmitted. It is further contemplated that the audio generated may be rendered to sound far away but also amplified with respect to other game sounds, or even replacing them.

Figure 3A:
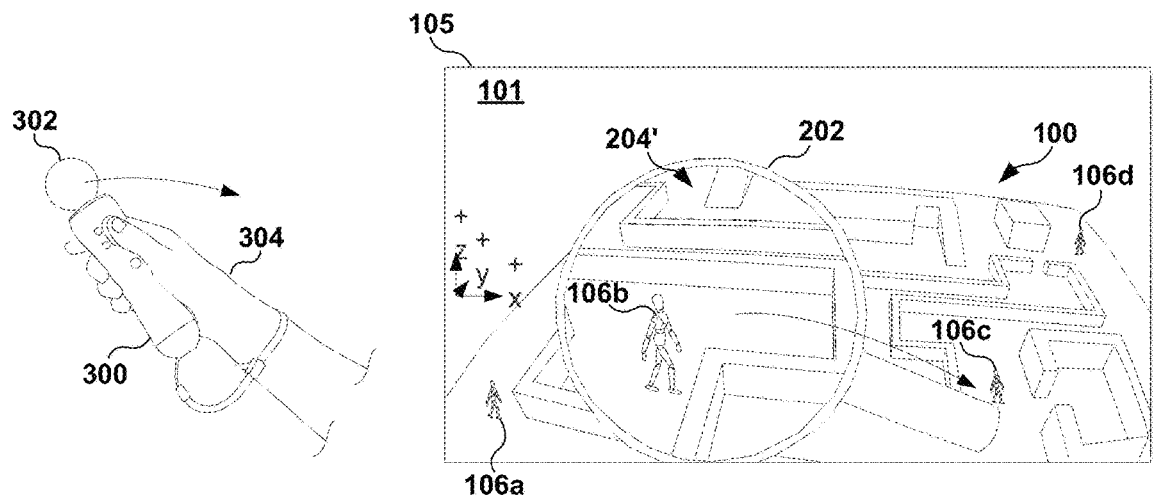
FIGS. 3A and 3B show an illustration of an HMD user moving a magnifying window to magnify various regions of an interactive space using handheld controller, according to one embodiment.
Figure 3B:
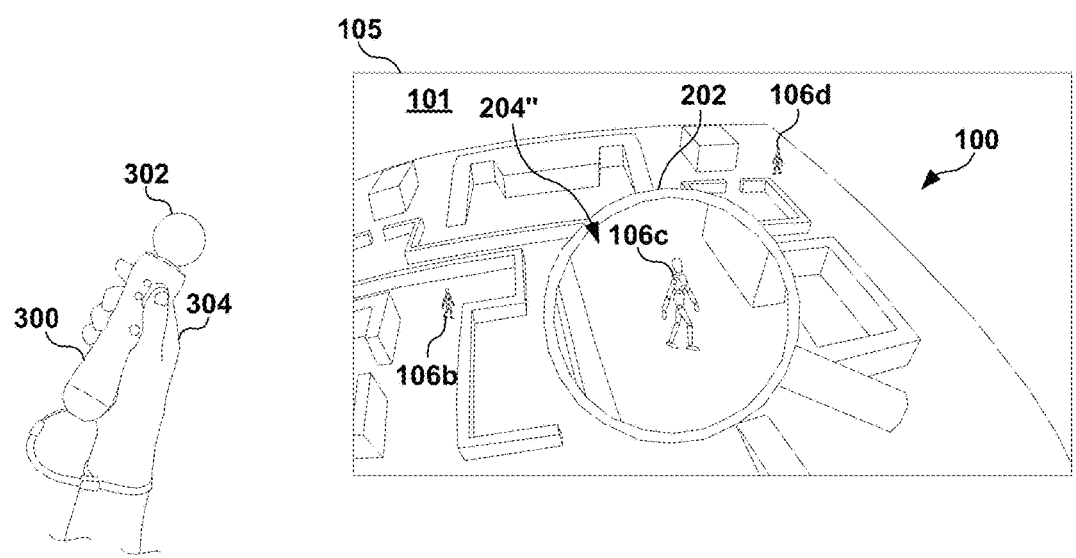

FIGS. 3A-3B shows an illustration of an HMD user moving a handheld controller 300 to move a magnifying window 202 to magnify different regions of an interactive environment 100, according to one embodiment. In FIG. 3A, the user holds the controller 300 with their hand 304 at a left-of-center position. The magnifying window 202 shows a magnified view 204' of player 106b. The controller 300 is shown to include a trackable component 302 that may be an illuminated object that an image capture device tracks within a real-world environment. When the user moves the controller 300 toward the right, the magnifying window 202 similarly moves toward the right as shown in FIG. 3B. As a result of the movement of the controller 302, the magnifying window 202 now shown a magnified view 204" of player 106c.

In addition to the rightward movement of the controller 300, the user may have also changed an orientation of the HMD to face toward the right. For example, the user may have turned their head toward the right while wearing the HMD. As a result, the far-right corner of the interactive environment 100 is closer to a center of the interface 105. It is contemplated that the positioning of the magnifying window 202 may either be dependent or independent of the orientation of the HMD. For example, in some embodiments where the position of the magnifying window 202 is independent of the orientation of the HMD, a rotation of the HMD while holding the controller 300 in place causes the magnifying window 202 to not move along with the HMD. As a result, the portion of the interactive environment 100 displayed within the magnifying window 202 remains the same before and after the rotation of the HMD. In embodiments where the position of the magnifying window 202 is dependent upon the orientation of the HMD, a rotation of the HMD while holding the controller 300 in place causes the magnifying window 202 to move along with the HMD. As a result, the portion of the interactive environment 100 that is displayed in the magnifying window 202 changes even though the real-world position of the controller does not change.

Although FIGS. 3A and 3B show a certain embodiment of a handheld controller 300, other handheld controllers may be used with the embodiments described here. For example, other controllers may be trackable via inertial sensors and not have a trackable component 300.

FIGS. 4A-4D illustrate a sequence of events that occur when a spectator enters into a magnifying window 202. For example, FIGS. 4A-4D each show camera placement diagrams 402a-402d alongside corresponding screenshots 404a-404d of the interface 105. A player may "enter" into the magnifying window 202 by providing a command to do so or by pressing a button of the controller. By entering into the magnifying window 202, the spectator is transitioned from the overhead view 101 to a third-person view of the region of the interactive environment 100 that is being magnified within the magnifying window 202. In doing so, the vantage point of the spectator is also changed from that of the overhead view 101 to a vantage point that is closer to the player 106b and more level with the interactive environment 100. As a result, the spectator is transported or translocated or teleported from a current position that is above the interactive environment 100 (e.g., for the more global overhead view 101) to a new position that is within the interactive environment 100 (e.g., for the more detailed third-person view). As such, the magnifying window 202 may also be referred to as a portal for its ability to mediate transportation of the spectator from one location to another. Additionally, entering the magnifying window 202 may be referred to as consuming a portal.

Figure 4A:
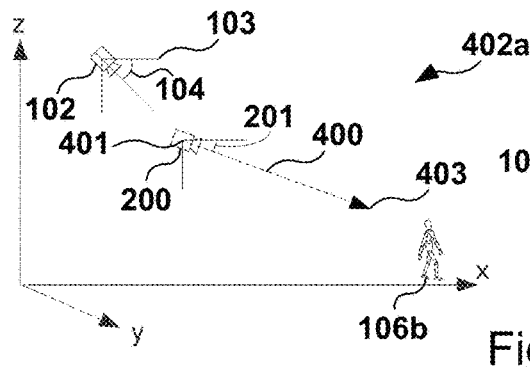
FIGS. 4A-4D illustrate a sequence of events that occur when a spectator enters into a magnifying window, according to one embodiment.
Figure 4A:
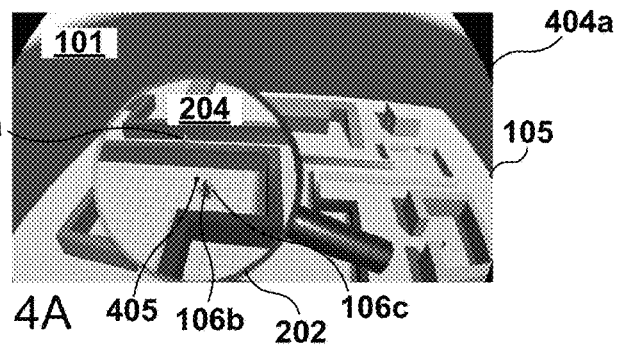

FIG. 4A shows a camera placement diagram 402a and a screenshot 404a of a spectator that is viewing the interactive environment 100 using a magnifying window 202 within an overhead view 101. The overhead view 101 is obtained via camera 102 placed relatively far above the interactive environment in the +z direction, while the magnified view 204 displayed within the magnifying window 202 is obtained via camera 200, which is placed closer to player 106b. Camera 102 is associated with a pitch 104 that may be different from the pitch 201 of camera 200. For example, the pitch 104 of camera 102 is steeper in the −z direction than is pitch 201 of camera 200.

When the spectator decides to enter into the magnifying window 202 to obtain a closer-up third-person view of player 106b, two functions may be applied concurrently to camera 200 to achieve the third-person view of player 106b, according to various embodiments. A first function is the zooming function, which moves or slides the camera 200 along path 400 from vantage point 401 to vantage point 403. The zooming function ensures that the vantage point of the spectator is closer to player 106b in the third-person view than it is in the magnified view 204. This is because while the magnified view 204 is closer to the player 106b than is the overhead view 101, it is still above the interactive environment 100 and therefore not close enough to player 106b to be availing of details or perspectives that are desired for a third-person view of player 106b. Thus, the zooming function effectively transports the spectator from what was an overhead view 101 and a magnified view 204 thereof to a third-person view and "in-game" view. The third-person view is more immersive in the sense that the spectator feels that they are "in the game" rather than observing the game from an elevated observation point.

A second function that may be applied to camera 200 when the spectator is entering into the magnifying window 202 is a pitch-matching function. If pitch 201 does not match pitch 102, the camera 200 will be rotated by the pitch-matching function about its pitch axis such that pitch 201''' matches pitch 104 once the camera 200 is moved to vantage point 403. The pitch-matching function ensures that the pitch of the third-person view matches a real-world pitch of the HMD of the spectator. For example, if the HMD of the spectator is at a pitch of −45° while viewing the overhead view 101, camera 102 should likewise have a pitch of −45°. However, camera 200 used to obtain the magnified view 204 may have a pitch of −30°. If the pitch-matching function is not applied when the spectator enters into the magnifying window 202, the third-person view will retain the same pitch as the magnified view 204, or −30°. Yet, the spectator's head and HMD would still have a pitch of −45°. In this instance, the spectator may "look up" and change the pitch of the HMD by +45° to be level with the horizon in the real-world but will have a virtual pitch of +15° relative to the horizon. On the other hand, if the spectator changes the pitch of the HMD by +30° to level with the horizon in the VR scene, the HMD would still be at a −15° pitch in the real-world. This results in virtual/real-world pitch mismatch. The pitch-matching function is implemented in various embodiments to resolve such situations. In other embodiments, pitch 104 will consistently be the same or similar to pitch 201. As a result, the zooming function may occur without the pitch-matching function.

In addition to the pitch-matching function, if there is a difference between the roll associated with the magnified view 204 and the roll associated with the overhead view (e.g., which should correspond to a real-world roll of the spectator's head and HMD), a roll-matching function 200 will also be applied to camera 200. When the roll-match function is applied, the eventual roll of the view subsequent to entering the magnifying portal 202 is matched with the real-world roll of the spectator's head and/or HMD. The roll-matching function also occurs during the zooming and pitch-matching functions such that camera 200 is rotated about the pitch and roll axes while also being moved translationally.

In FIG. 4A, the spectator has initiated the entry process into the magnifying window 202. The entry process, which includes a zooming function, moves the vantage point of spectator generally in the direction of the region of the interactive environment 100 that is displayed within the magnifying window 202. However, the region displayed within the magnifying window 202 may be rather expansive and include a number of players and destinations. For example, the magnifying window 202 in screenshot 404a shows three players 106a-106c as well as a number of walls. In certain embodiments, the zooming function will move the vantage point of camera 201 towards a location within the interactive environment 100 associated with the center 405 of the magnifying window. In these embodiments, the zooming function establishes a path 400 with a destination vantage point 403 that corresponds to the center 405 of the magnifying window 202. FIGS. 4A-4D show such an embodiment. In other embodiments, the zooming function may automatically identify a location within the region displayed in the magnifying window 202 such as a location posterior to a player that is closest to center 405, or other location that is of interest.

Figure 4B:
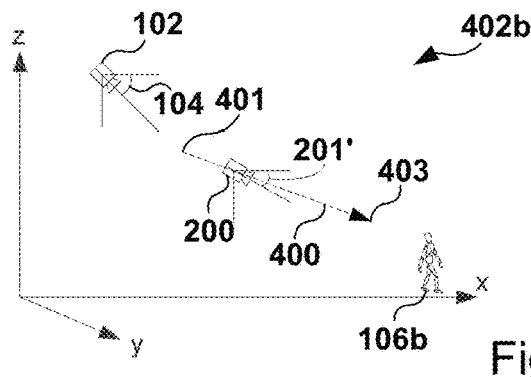
Figure 4B:
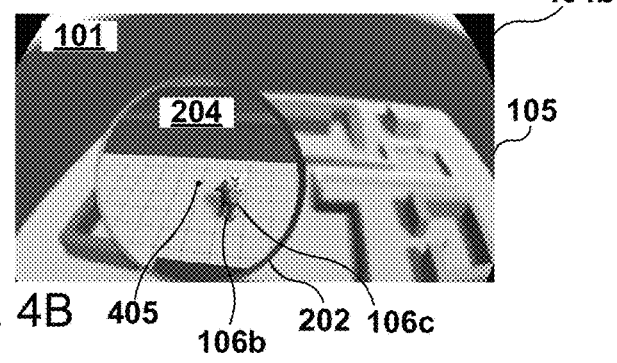

In FIG. 4B, camera 200 has begun migrating along path 400 toward the destination vantage point 403 as shown in the camera placement diagram 402b. Accordingly, the magnified view 204 appears to have moved closer to player 106b in the direction of the center 405 of the magnifying window 202. Additionally, in the period separating FIGS. 4A and 4B, the pitch-matching function has begun to adjust the pitch 201' to be steeper relative to the horizon. The camera 102 used to capture the overhead view 101 generally stays in place. Moreover, the overhead view 101 that is still visible in the background of the magnified view 204 begins to be blurred. This is to enable the spectator to focus on the region within the interface 105 where movement is to occur.

Figure 4C:
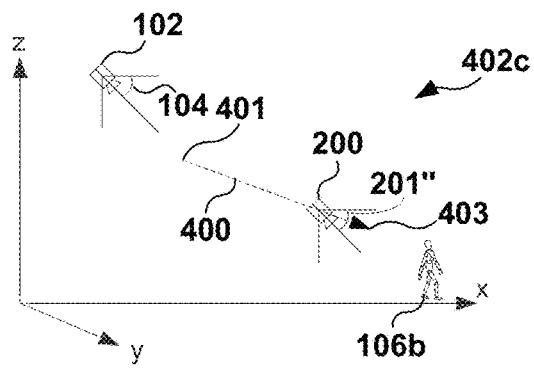
Figure 4C:
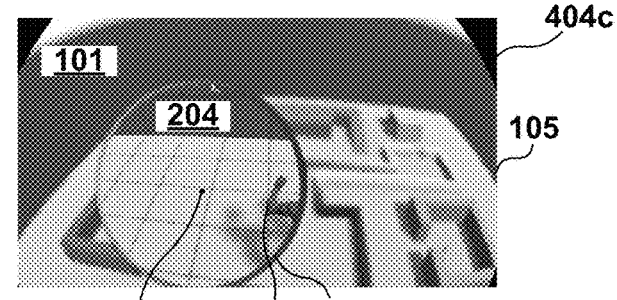

The entry process continues in FIG. 4C, where the camera 200 is shown to continue to migrate along path 400 closer to vantage point 403. Correspondingly, the magnified view 204 is shown to be much closer to player 106b in the direction of the center 405 of the magnifying window 202. Additionally, the period separating FIGS. 4B and 4C, the pitch-matching function has continued to adjust pitch 201" such that it is steeper and closer in value to pitch 104 than is pitch 201'.

Figure 4D:
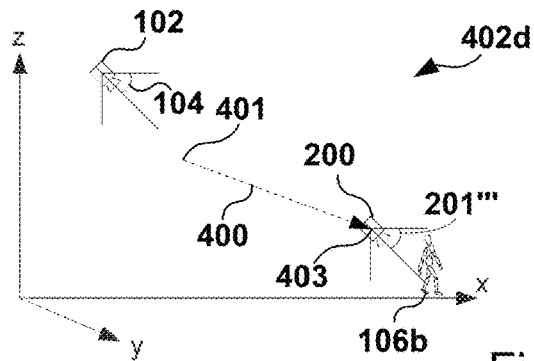
Figure 4D:
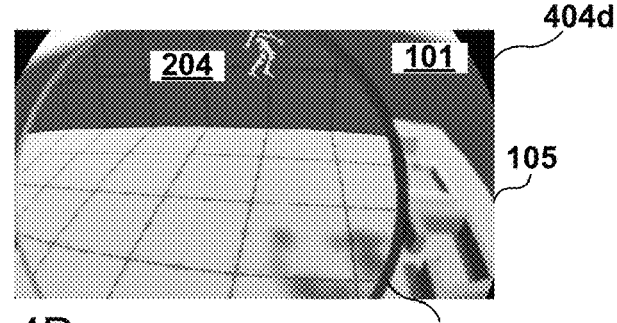

In FIG. 4D, the zooming function and the pitch-matching function are completed. As a result, the vantage point of camera 200 has reached vantage point 403 and movement of camera 200 ceases. Additionally, the pitch 201'" has been matched to pitch 104 and the pitch adjustment of camera 200 ceases. The resulting screenshot 404d shows that the magnified view 204 has been migrated to the vantage point 403. The magnified view 204 does not include the player 106b because the player 160b was not directly at the center 405 of the magnifying window 202. The screenshot 404d shows that the magnifying portal 202 is expanding in size such that the overhead view 101 is replaced. This process may be referred to as "wiping away" the magnifying portal 202. Once the magnifying portal 202 is wiped away, the magnifying portal 202 disappears and magnified view 204 simply becomes a third-person view.

Figure 5A:
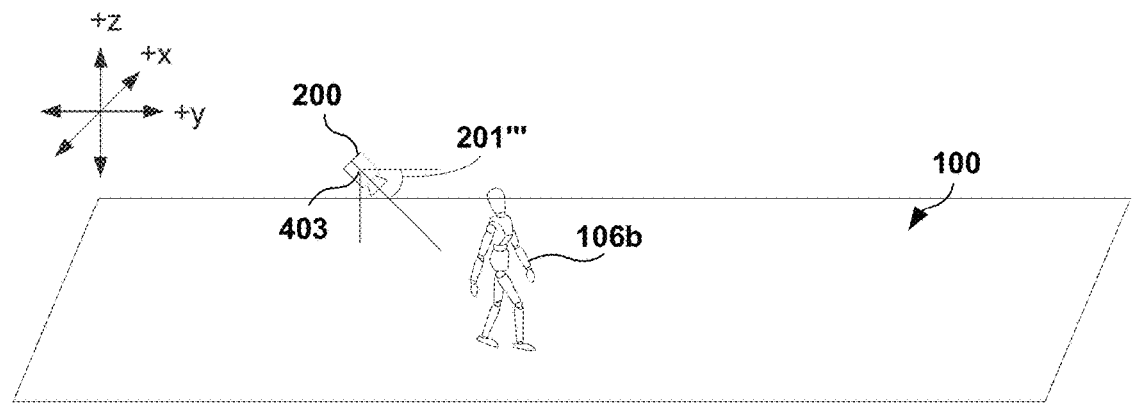
FIGS. 5A and 5B show a resulting third-person view of the player after the magnifying window of FIG. 4D has been wiped away, according to one embodiment.
Figure 5B:
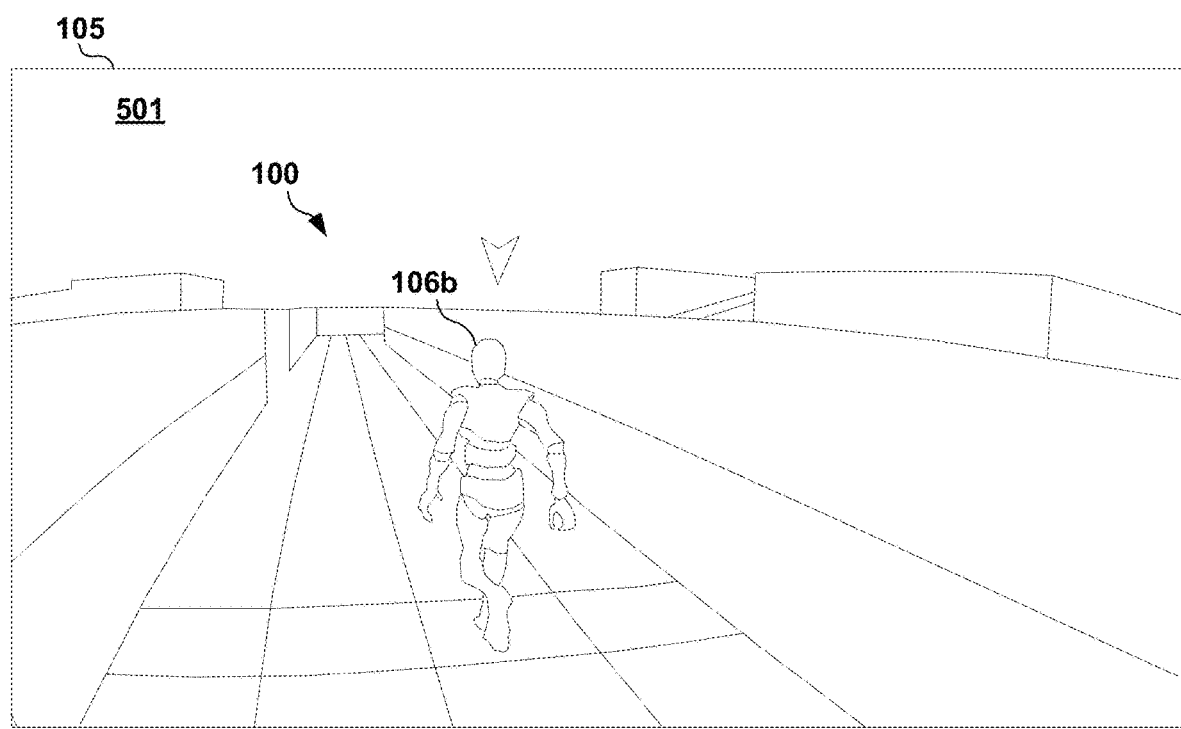
Figure 8A:
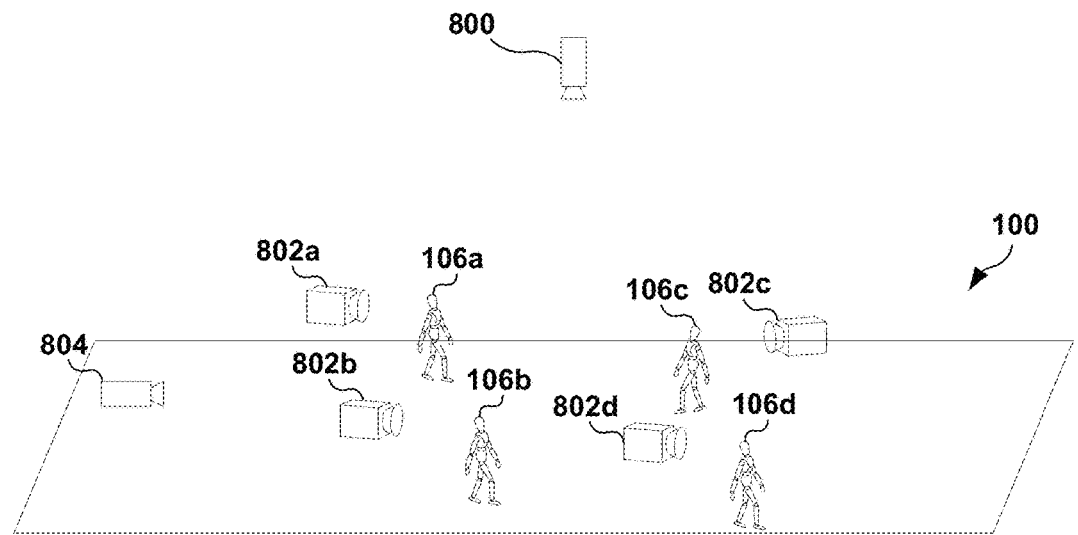
FIGS. 8A and 8B show a camera placement diagram and a corresponding interactable map view, respectively, of the interactive environment, according to one embodiment.
Figure 8B:
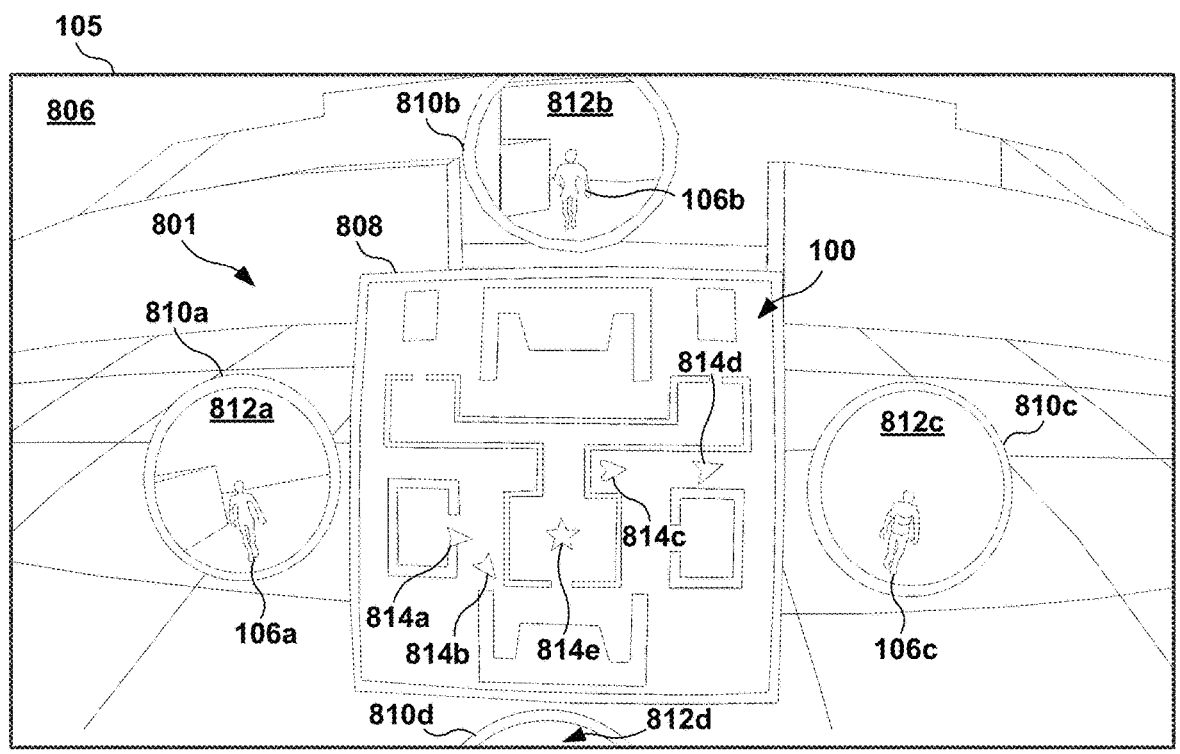

FIGS. 5A and 5B show a resulting third-person view 501 of player 106b after the magnifying window 202 of FIG. 4D has been wiped away. Camera 200, which is now being used to capture the third-person view 501 instead of the magnified view 204 is shown to be roughly at a similar height as player 106b. That is, the vantage point 403 of camera 200 is roughly altitudinally level with both the player 106b and the interactive environment 100. As a result, the spectator is not only relatively close-up to the player 106b, but also feels inside or immersed in the game. Once the third-person view 501 is provided, the spectator may be free to navigate the interactive environment 100 and to follow player 106b. In certain embodiments, follow-assist functions and catch-up functions as described in related U.S. patent application Ser. No. 16/355,668, entitled "METHODS AND SYSTEMS FOR SPECTATING CHARACTERS IN FOLLOW-MODE FOR VIRTUAL REALITY VIEWS," filed Mar. 14, 2019, may be used to mediate following of player 106b by the spectator. Additionally, the spectator may switch back to the overhead view 101, switch to an interactable map view as shown in FIGS. 8A and 8B, or press a button of the controller to "flip between channels" that cycles between which player to spectate.

Figure 6A:
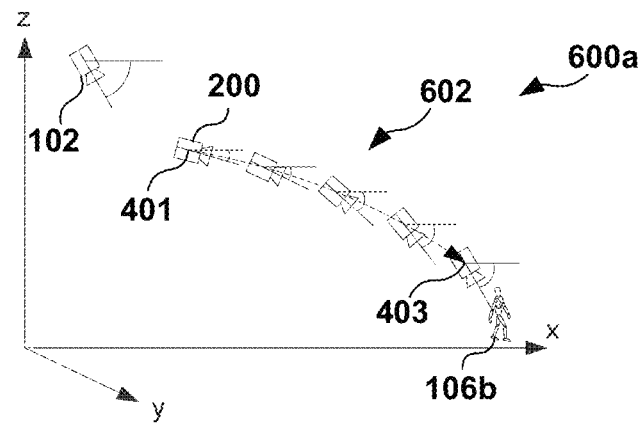
FIGS. 6A-6C show camera placement diagrams, each representing a different path the magnified view camera may take during the zooming function, according to some embodiments.
Figure 6B:
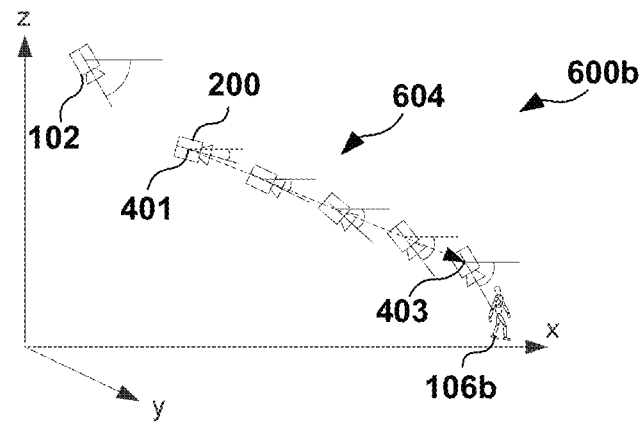
Figure 6C:
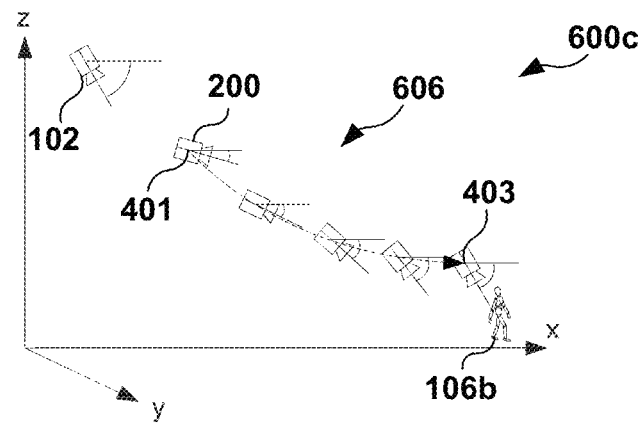
Figure 7A:
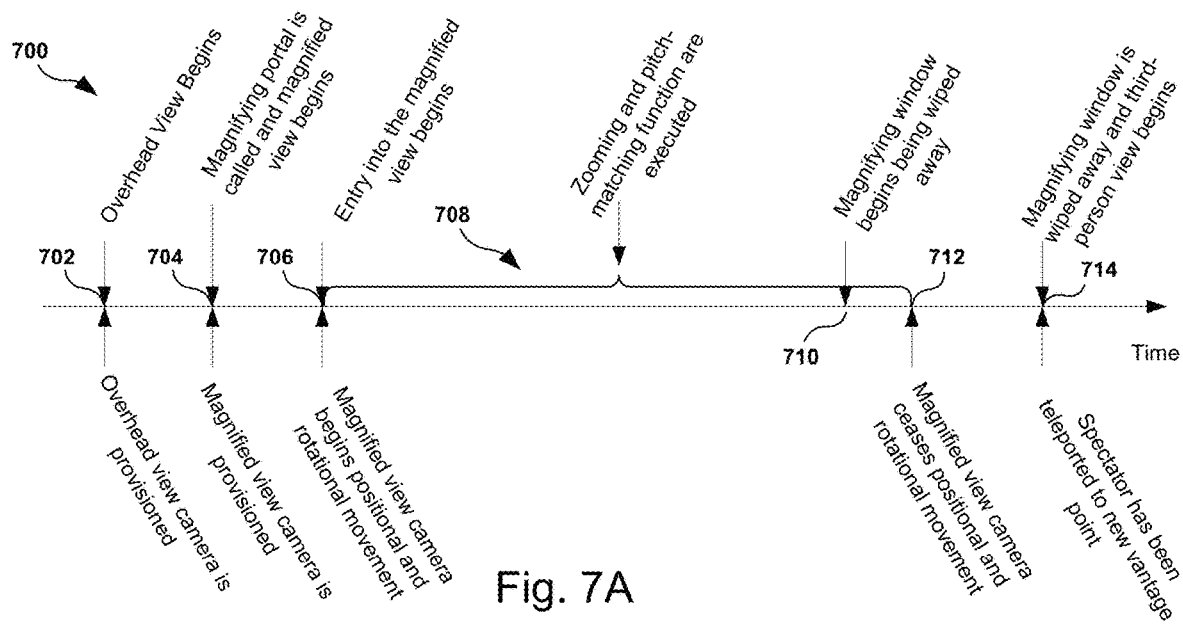
FIGS. 7A-7D show a timeline of events attendant to entering into a magnifying window from an overhead view, according to one embodiment.
Figure 7B:
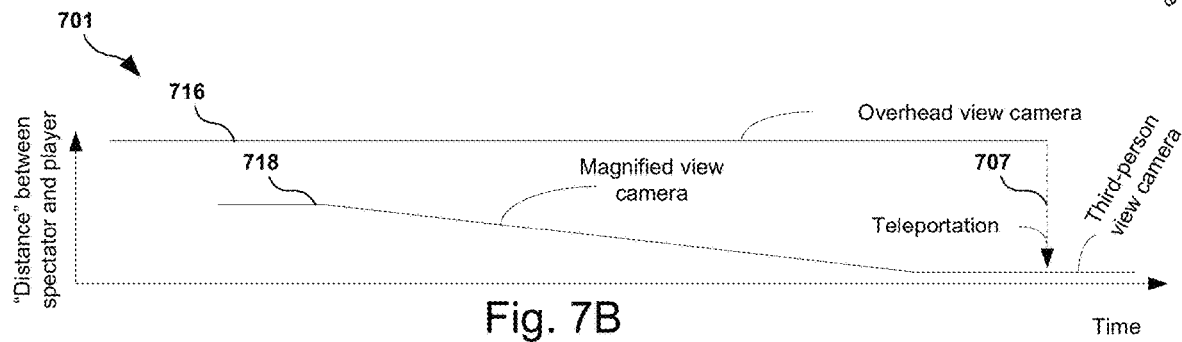
Figure 7C:
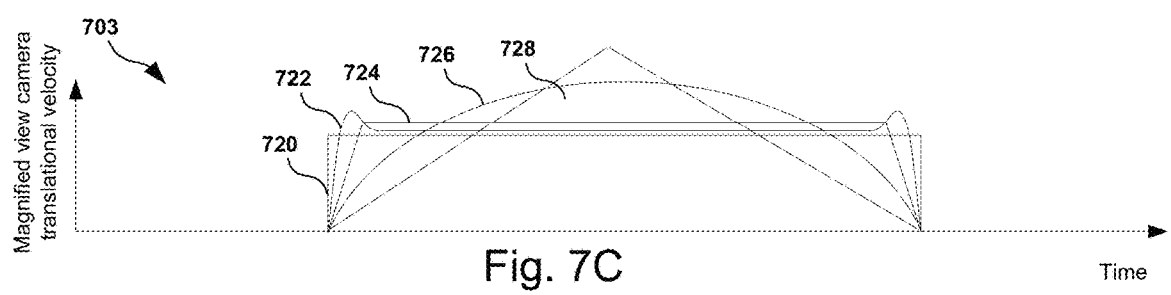
Figure 7D:
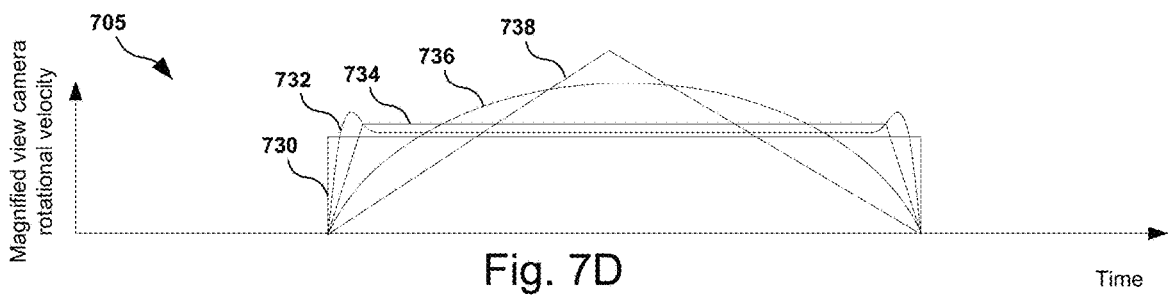

FIGS. 6A-6C show camera placement diagrams 600a-600c, each representing a different path camera 200 may take during the zooming function, according to some embodiments. FIG. 6A, for example, shows camera 200 traveling along a non-linear concave-down path 602. FIG. 6B shows camera 200 traveling along a linear path from vantage point 401 to vantage point 403. FIG. 6C shows camera 200 traveling along a non-linear concave-up path 606. Other paths may be used to migrate camera 200 from vantage point 401 to vantage point 403. In each of the illustrated paths 602, 604, and 606, the camera 200 is concurrently being rotated about the pitch and roll axes to match the pitch and roll of camera 102 and those of the spectator's head and/or HMD.

FIGS. 7A-7D show a timeline of events attendant to entering into a magnifying window from an overhead view, according to one embodiment. Timeline 700 shows a contemplated sequence of events occurring before, during, and after a spectator has entered into a magnified view to achieve a third-person view of a player or other object within the interactive environment. Graph 701 plots a distance between a vantage point of the spectator and the player against timeline 700, while graph 703 plots the translational velocity of the magnified view camera against timeline 700 and graph 705 plots the rotational velocity of the magnified view camera against timeline 700.

At time 702 on timeline 700, the overhead view begins when the overhead view camera is provisioned. At time 704, the spectator selects a magnified view by, for example, raising a handheld controller in front of the HMD, by pressing down a button on the controller, or by dictating a voice command, etc. In response, a computing device executing the spectator interface provisions a magnified view camera that is closer to the player than is the overhead view camera, and, in doing so, the magnified view begins. At time 706, the spectator performs an input to enter into the magnified view to initiate entry into the magnified view. Also, at time 706, the magnified view camera may begin positional and rotational movement as part of the zooming and pitch-matching functions, although this may also occur after time 706. During time period 708, the zooming and pitch-matching function are executed such that the vantage point of the magnified view is brought closer to the player and that the pitch of the magnified view is brought closer to a real-world pitch of the spectator, respectively.

At time 710, the magnifying window displaying the magnified view begins being wiped away. For example, the magnifying window may expand to reveal more and more of the magnified view until the magnified view eventually becomes the third-person view at time 714. In some embodiments, the magnifying window may begin being wiped away before the magnified view camera ceases positional and rotational movement. That is, for example, the magnified view camera may continue being brought closer to the player and may continue being rotated for pitch-matching while the magnifying portal is expanding. Thus, in some embodiments, the magnified view camera ceases positional and rotational movement anywhere between time 710 and time 714, including at time 714. In other embodiments, the magnified view camera ceases positional and rotational movement at time 710 when the magnifying window begins being wiped away. At time 714, the magnifying window has been completely wiped away (e.g., it expands until it disappears from view). As such, what was the zoomed and pitch-adjusted magnified view becomes a third-person view of the player. Additionally, when the magnifying window is completely wiped away at time 714, the spectator can be said to have been teleported from a vantage point of the overhead view to the vantage point of the third-person view.

Graph 701 shows plots 716 and 718 of distances separating the overhead view camera and the magnified view camera, respectively, from the player along the timeline 700. Plot 716 of the overhead view camera is shown to be constant or relatively constant throughout the process of entry into the magnified view. Plot 716 also shows that the overhead view camera ceases to be used once the magnifying window is wiped away and the third-person view begins at time 614. Plot 718 illustrates that the distance between the magnified view camera and the player may change at a relatively constant rate during period 708. Teleportation 707 is also represented in graph 701 as an "instantaneous" jump from the distance of plot 716 and the distance of plot 718 at time 714 after the magnifying window is wiped away.

Graph 703 plots the translational velocity of the magnified view camera against timeline 700. In some embodiments, the translational velocity of the magnified view is constant or relatively constant as shown in plots 720, 722, and 724. In other embodiments, the translational velocity may be non-constant as show in plots 726 and 728. Other translational velocities may also be utilized with embodiments described here.

Graph 705 plots the rotational velocity of the magnified view camera against timeline 700. The rotational velocity refers to the speed at which the magnified view camera is rotated about the pitch axis for pitch-matching, roll-axis for roll-matching, or about the yaw axis for yaw-correction (which is discussed in further detail below). In some embodiments, the rotational velocity of the magnified view is constant or relatively constant as shown in plots 730, 732, and 734. In other embodiments, the rotational velocity may be non-constant as show in plots 736 and 738. Other rotational velocities may also be utilized with embodiments described here.

FIGS. 8A and 8B show a camera placement diagram and a corresponding interactable map view 801, respectively, of the interactive environment 100, according to one embodiment. In addition to overhead views, magnified views, and third-person views, an interactable map view 801 is contemplated. The interactable map view 801 is envisioned to provide a quick reference to the position and movement of various players 106a-106d and may be triggered or brought within view of the interface 105 while the spectator is viewing one of the other views. For example, the spectator may be viewing a third-person view of the interactive environment 100 that includes a view of a certain player. The spectator may be interested in spectating a different player or a different region of the interactive environment. The interactable map view 801 is envisaged to provide a seamless way for a spectator to be apprised of the locations of various players as well as to enter into a different third-person view of a different player. The interactable map view 801 thus enables the spectator to toggle between third-person views of different players. The interactable map view 801 may generally be available to the spectator from any of the other views but may be especially useful when the spectator is currently in a third-person view and desiring of a different third-person view.

FIG. 8A shows a camera placement diagram relative to players 106a-106d within an interactive environment 100, according to one embodiment. FIG. 8B shows an embodiment of an interactable map view 801 that includes a map 808 of the interactive environment 100 and player portals 810a-810d displaying respectively player portal views 812a-812d. In FIG. 8A, camera 800 placed directly above the interactive environment 100 to obtain the view shown in map 808. In other embodiments, the map 808 is a "minimap" that is rendered based on the locations and orientations of the players 106a-106d. Camera 804 is used to capture a third-person view 806 that may have been the entire view displayed to the spectator prior to selecting the interactable map view 801.

Cameras 802a-802d are each positioned to follow from behind players 106a-106d, respectively. Each of cameras 802a-80d captures player portal views 812a-812d that are displayed within player portals 810a-812d. It is contemplated that each of cameras 802a-802b are to be within a distance away from the respective players 106a-106d such that the players 106a-106d as well as some of their surrounding is viewable within the player portal views 812a-812d. As such, for example, camera 802a should be far enough away from player 106a that when the video images are captured and subsequently cropped, player 106a is fully or nearly fully within view in the player portal 810a. For example, if the camera 802a is placed too close to the player 106a, the player may occupy too much of the video images such the player 106a is not fully within view in the player portal 810a subsequent to cropping of the video images to fit the player portal 810a.

FIG. 8B shows the interactable map view 801 being displayed to a spectator with a third-person view 806 in the background, according to one embodiment. The map 808 is a two-dimensional representation of the interactive environment 100 that includes elements of the interactive environment 100 such as walls and obstacles. Additionally, the map 808 includes indicators 814a-814d respective of players 106a-106d that representing their position, orientation, and movement within the interactive environment 100. Other game actions or objects may also be represented in the map 808. Additionally, an indicator 814e in the shape of a star represents where the spectator is located in the interactive environment 100.

The interactable map view 801 is contemplated to be a billboarded view such that it is generally facing the spectator. Additionally, the interactable map view 801 elements may be presented in two-dimensions. For example, each of the player portal views 812a-812d may be a flattened two-dimensional view of the respective players 106a-106d and the surrounding environment.

The interactable map view 801 is also contemplated to be controllable in positioning using the spectator's controller. For example, the spectator may move the interactable map view 801 along with the map 808 and the player portals 810a-810b up or down or toward the left or right using a handheld controller.

In various embodiments, the spectator may be able to interact with the interactable map view 801 using their gaze. For example, when a spectator gazes roughly in the direction of one of the player portals 810a-810d, it may subsequently be enlarged to reveal more the respective players' 106a-106d vicinity. That is, for example, if the spectator gazes toward the player portal view 812a within the player portal 810a for a certain period (e.g., about 0.25 seconds to about 1 second), the player portal 810a may expand in size to reveal more of the player portal view 812a (e.g., the video images captured by camera 802a are cropped to a lesser extent). The remaining player portals 810b-810d remain at a default size. The same gaze-based enlarging function may be used to enlarge the map 808 as well when the spectator places their gaze on the map 808 for a certain period. When the spectator changes their direction of gaze for a certain period, the player portal 810a-810d or the map 808 that was enlarged will return to a default size.

In various embodiments, the player portals 810a-810d, when gazed at, may be accompanied by audio generated by the respective player and its surroundings within the player portal. For example, if the spectator were to gaze at player portal 810a, the spectator may be selectively communicated with sounds generated by player 106a and by game sounds that occur within the vicinity of player 106a. If the spectator does not gaze at a certain player portal 810a-810d, the audio that the spectator receives may be a blend of audio from each of the player portals 810a-810d.

To facilitate seamless tracking of which of the player portals 810a-810d corresponds to which player 106a-106d, the player portals 810a-810d may be color-coded to match a color of the respective players 106a-106b, as well as the respective indicators 814a-814d. For example, if player 106a is blue in color, the player portal 810a and the indicator 814a may be colored blue as well. Additionally, it is contemplated that a line-mapping function may be used to draw a color-coded line connecting the player portals 810a-810d to the corresponding indicators 814a-814d. The line-mapping function may be activated only for one of the player portals 810a-810d where the spectator's gaze is directed or may be activated for each of the player portals 810a-810d regardless of the placements of the spectator's gaze.

As noted above, the interactable map view 801 is contemplated to facilitate seamless transitions from a current third-person view to a new third-person view as well as concurrent spectator teleportation to a new vantage point for obtaining the new third-person view. One way to facilitate the transition from a current third-person view (e.g., third-person view 806) to a new third-person view (e.g., that of player 106a) is to enable the spectator to "enter" the player portal 810a similar to how the spectator is enabled to "enter" the magnifying window 202. When the player gazes at player portal 810a for at least a threshold of time to enlarge the player portal 810a and subsequently clicks a button on the controller or makes some other command, the player portal view 812a will replace the third-person view 806 within the interface. In so doing, the spectator will be teleported from the current vantage point of the current third-person view 806 to a new vantage point of the new third-person view of player 106a.

From the interactable map view 801, the spectator may also decide to enter into an overhead view such as that shown in FIG. 1B. The spectator may command such a view by pressing a button on the controller. A portal wipe may facilitate the change of perspective from the interactable map view 801 to the overhead view, which results in a vantage point of being placed far above the interactive environment 100. In this view, the interactive environment 100 appears relatively smaller to the spectator and offers a global view of the interactive environment 100. In this implementation, the magnifying window 202 is automatically enabled in the overhead view, so that the controller that was originally controlling the position of the interactable map 801 now controls the magnifying window 202.

Figure 9A:
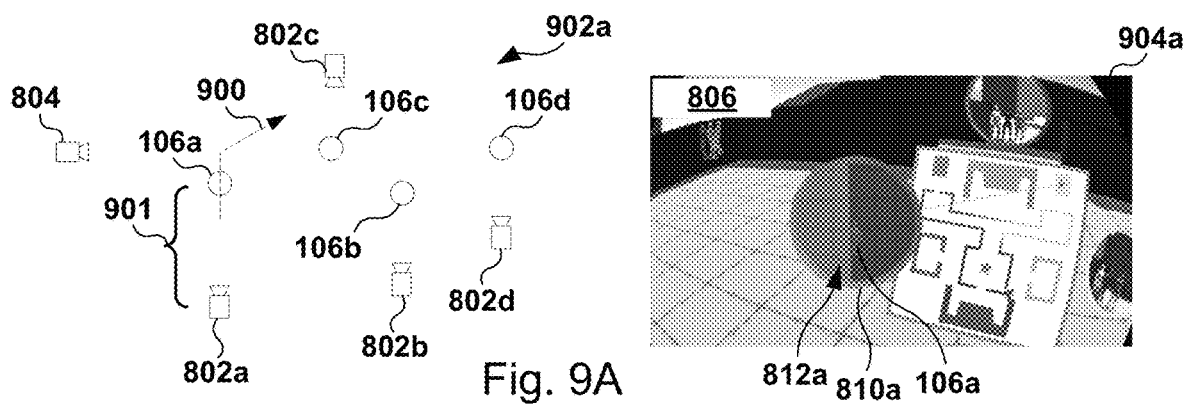
FIGS. 9A-9D show a sequence of events illustrating how the spectator is enabled to enter into a player portal, according to one embodiment.

FIGS. 9A-9D show a sequence of events illustrating how the spectator is enabled to enter into a player portal 810a, according to one embodiment. Each of FIGS. 9A-9D show camera placement diagrams 902a-902d on the left along with a corresponding snapshots 904a-904d of the spectator interface on the right. In FIG. 9A, the spectator has selected to enter into player portal 810a associated with player 106a. When the spectator decides to enter into player 810a by gazing at player portal 810a and providing some input, the player portal 810a beings to occupy a more prominent position in the interface. For example, the interactable map view as a whole moves to the right such that the player portal 810a is more central within the spectator interface while the remaining player portals are moved to the side. In this manner, the spectator's attention, focus, and gaze is directed to the player portal 810a. While this is occurring, player 106a is moving along path 900 and camera 802a continues to follow player 106a as player 106a moves as shown in the camera placement diagram 902a of FIG. 9A. Camera 802a maintains a distance 901 from player 106a as player 106a moves along the path 900.

Figure 9B:
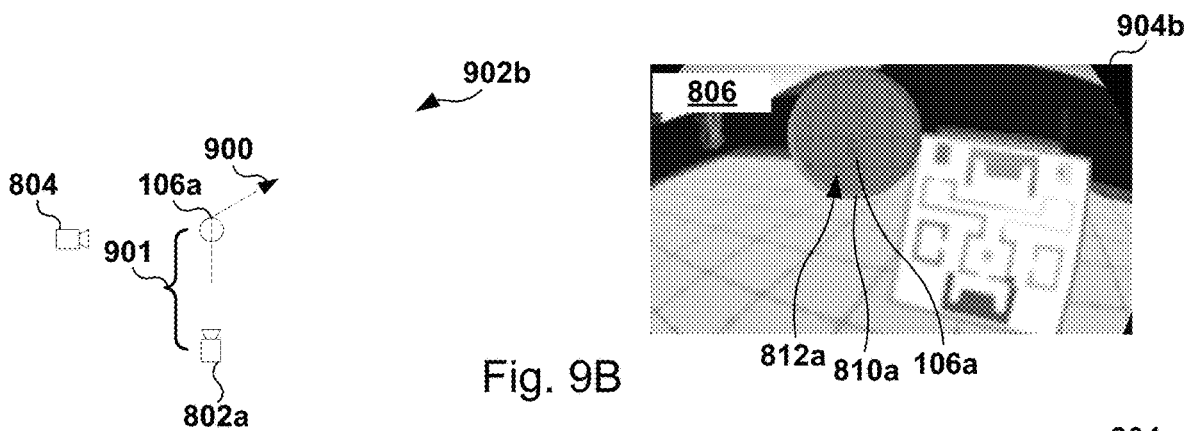

In FIG. 9B, the player 106a has moved in a northward direction along path 900 and the camera 802a has made a corresponding movement to follow player 106a such that distance 901 between camera 802a and the player 106a remain relatively consistent. During the period between the events depicted in FIGS. 9A and 9B, cameras 802b-802d are no longer being used and are no longer shown in FIG. 9B and onward. Accordingly, the snapshot 904b no longer shows player portals or player portal views associated with cameras 802b-802d, although the map may still be within view. In certain embodiments, the remaining portions of the interface that is not the player portal 810a or the player portal view 812a begins to be blurred. Camera 804 used to capture the "current" third-person view 806 remains unchanged in location.

Figure 9C:
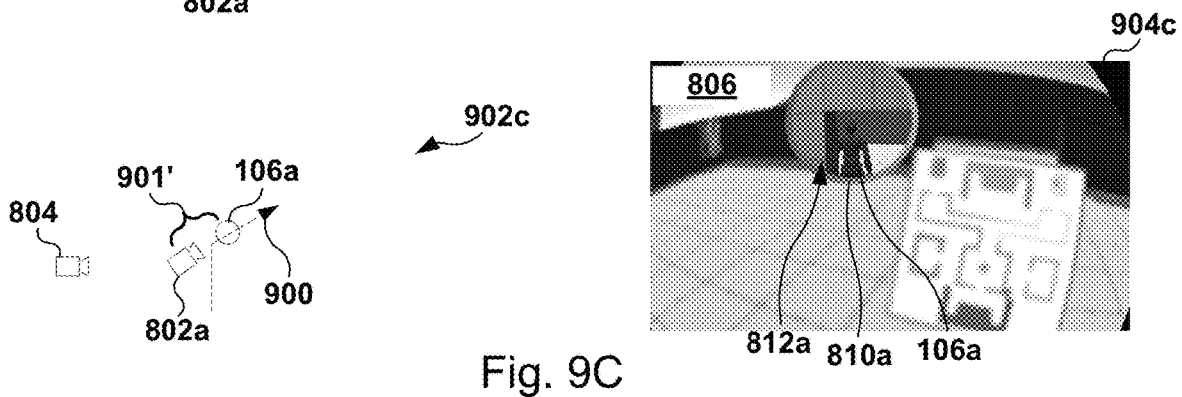

In the camera placement diagram 902c of FIG. 9C, the player 106a continues to move along path 900, which includes a slight turn to the northeasterly direction. While camera 802a continues to follow player 106a in the sense that it is more or less behind player 106a and faces also in the northeasterly direction, the zooming function has also been applied between the events depicted in FIGS. 9B and 9C. As noted above, the zooming function closes the gap between the camera 802a and player 106a in preparation for the player portal view 812a to become a new third-person view. As such, the zooming function causes distance 901' to be reduced from distance 901 so that the vantage point of camera 802a is close enough to player 106a that the player 106a does not appear to be distant when the player portal view 810a is expanded to become a new third-person view in FIG. 9D. Camera 804 used to capture the "current" third-person view 806 remains unchanged in location.

The snapshot 904c shows the result of the zooming function as applied to camera 802a. For example, in snapshot 904c the player 106a appears much closer to the spectator within the player portal view 812a and occupies a greater proportion of the player portal 810a than it does the player portal view 812a and the player portal 810a in snapshot 904b.

Figure 9D:
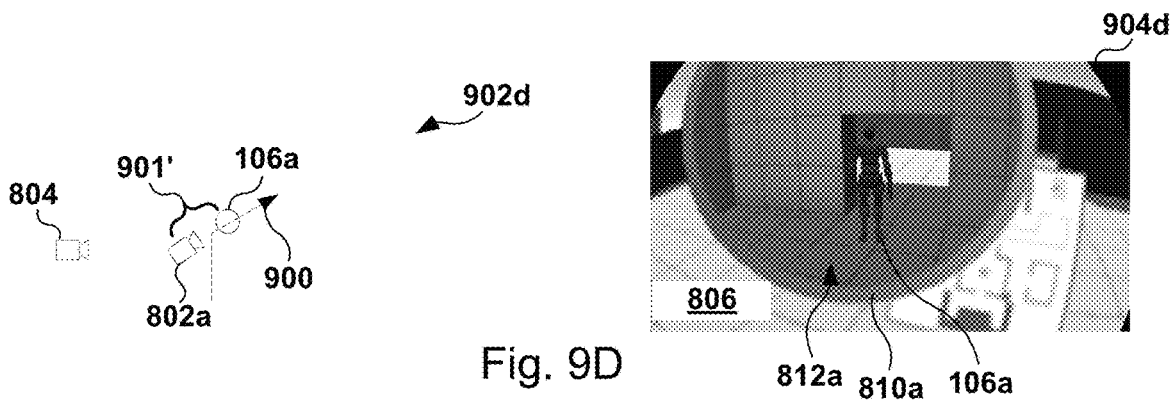

In FIG. 9D, the player portal 810a is wiped away by expanding in size to replace the previous third-person view 806. In doing so, what was the player portal view 812a becomes the current third-person view. Additionally, by wiping away the player portal 810a, the spectator is effectively teleported from a previous vantage point of camera 804 to a current vantage point of camera 802a. After the player portal 810a is wiped away, the spectator may again navigate the interactive environment using the controller and HMD, as well as to bring back the interactable map view to enter into a third-person view of a different player.

In addition to the zooming function, the pitch-matching function may be executed when a spectator decides to enter into the player portal 810. For example, in pitch of the third-person view 806 and that of the player portal view 812a in FIG. 9A do not appear to be similar. In particular, the third-person view 806 appears to be angled downward while the player portal view appears to be pitched fairly horizontally. The pitch-matching function ensures that the pitch of the player portal view 810a matches the real-world pitch of the spectator. As a result, for example, the pitch of the player portal view 812a matches that of the third-person view 806 that is outside of the player portal 810a.

Figure 10A:
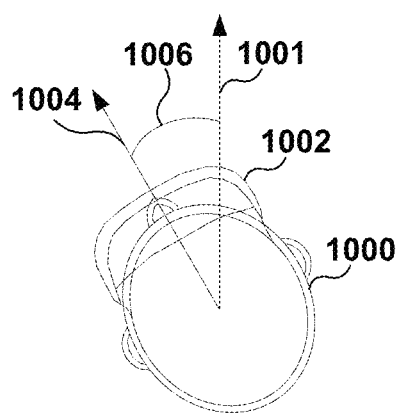
FIGS. 10A-10C illustrate a yaw-correction function that may be executed during entry into a magnifying window or entry into a player portal, according to various embodiments.
Figure 10A:
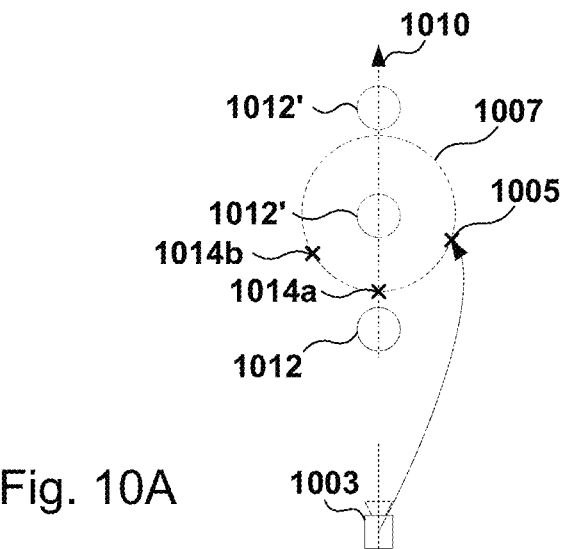
Figure 10B:
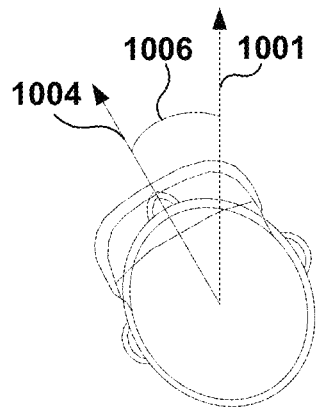
Figure 10B:
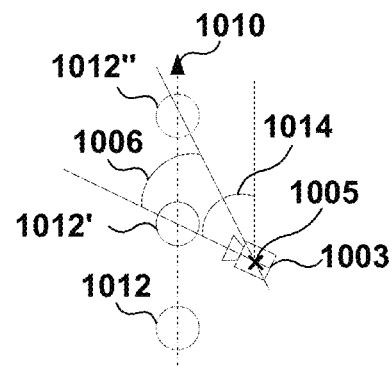
Figure 10C:
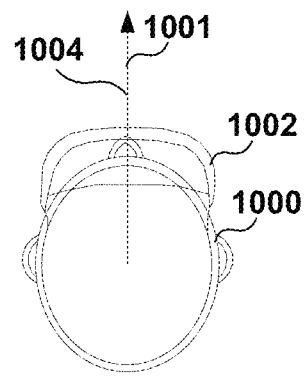
Figure 10C:
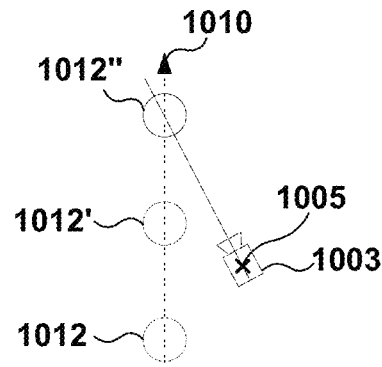
Figure 11A:
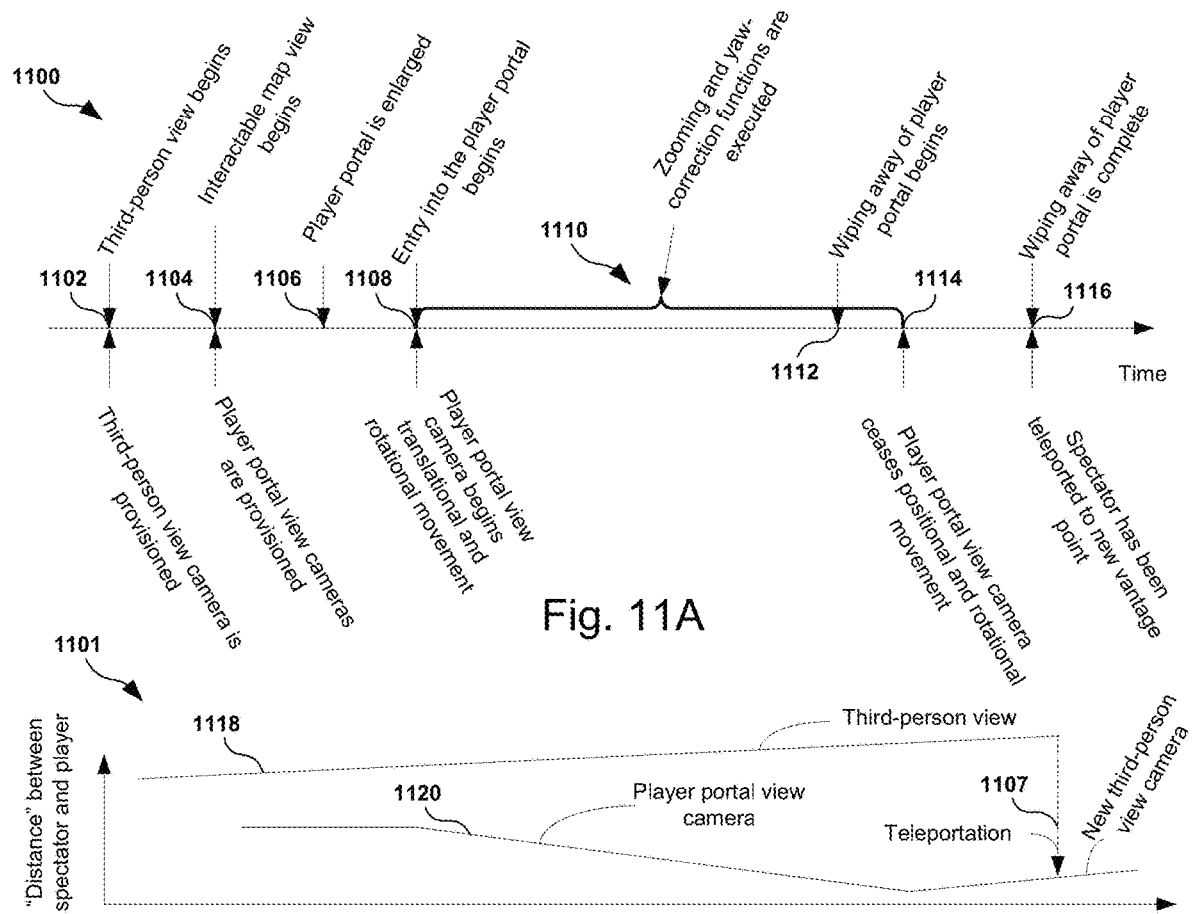
FIGS. 11A-11D show a timeline of events attendant to entering into a player portal of an interactable map view that is displayed during a third-person view, according to one embodiment.
Figure 11B:
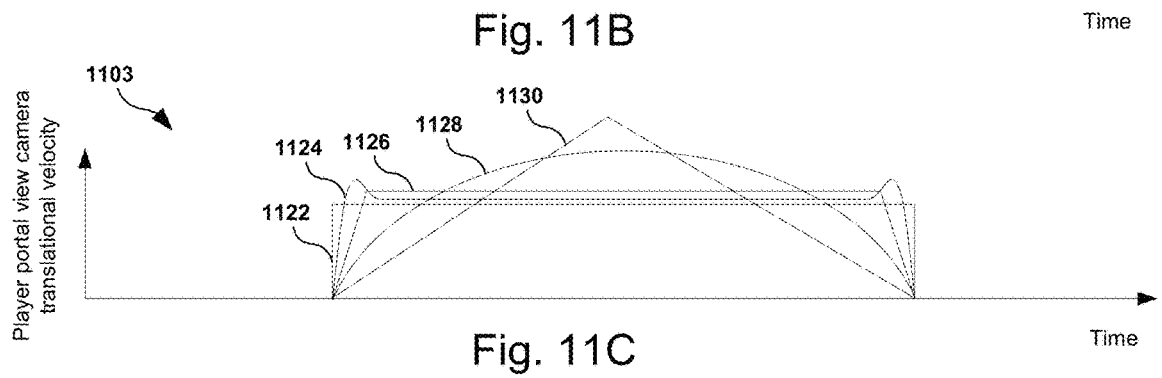
Figure 11C:
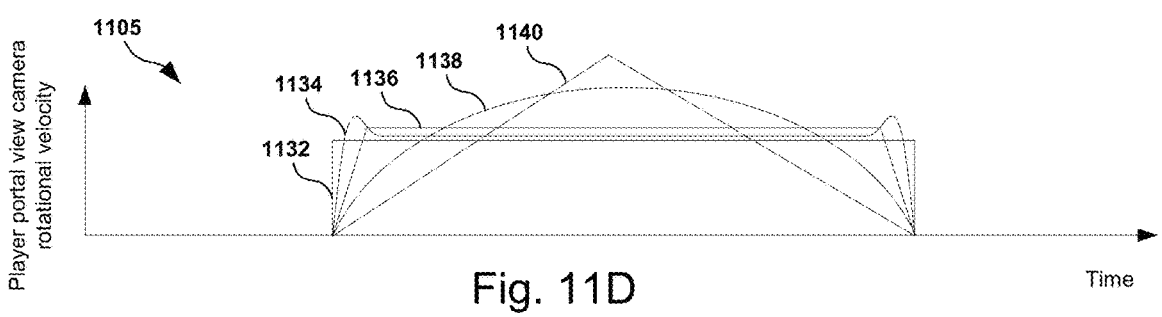
Figure 11D:
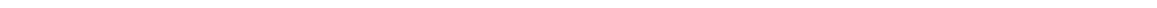

FIGS. 10A-10C illustrate a yaw-correction function that may be executed during entry into a magnifying window or entry into a player portal, according to various embodiments. When wearing an HMD 1002, a spectator 1000 typically has a default forward direction 1001 when spectating the interactive environment. The forward direction 1001 may correspond to a direction the faces a camera that tracks the HMD. In other embodiments, the default forward direction 1000 may be defined by a direction the spectator 1000 faces when sitting on a chair or on a couch. Oftentimes, the VR environments will encourage the spectator 1000 to turn their head toward the left or right (e.g., about the yaw axis). Sometimes it can be straining or tiring to consistently have the spectator 1000 turn their head in one direction to follow the action of the game. The yaw-correction function is contemplated to re-center the head of the spectator 1000 during the processes of entry into a magnifying window or a player portal. More particularly, the yaw-correction function identifies a destination vantage point to place the camera that allows the spectator 1000 to de-rotate their head by looking in the direction of the target player. The vantage point is calculated based on the target player's predicted near-term path in the environment along with the head rotation that is expected of the spectator 1000 to follow the target player as the target player moves along the predicted near-term path.

In FIG. 10A, the spectator 1000, and by extension, the HMD 1002 are facing direction 1004 that is rotated by angle 1006 from the forward direction 1001. While the spectator 1000 is facing direction 1004, they may have selected to enter into a player portal to catch up to the player. As noted above, a player portal view generally follows from behind a player and the view is eventually zoomed if the spectator chooses to enter into the player portal. FIG. 10A shows a camera 1003 used to capture the player portal view of the player at a current position 1012 just prior to being moved for the zooming function. The player is predicted to follow path 1010 and to occupy positions 1012' and 1012" at future times. The zooming function brings the camera 1003 within a certain distance from the player, for example, somewhere on the circle 1007. However, if camera 1003 is moved to vantage point 1014a, the spectator 1000 would have to maintain a head rotation of angle 1006 to effectively follow the player. If camera 1003 is moved to vantage point 1014b, the spectator 1000 would have to rotate their head even more to left to follow the player as the player moves to position 1012". Instead, if the camera 1003 is moved to vantage point 1005, the spectator 1004 would de-rotate their head while following the movement of the player from position 1012' to position 1012". The yaw-correction function finds destination vantage points such as vantage point 1005 that allows the spectator 1000 to de-rotate their head while following the player's future movements.

In FIG. 10B, the spectator 1000 is still facing direction 1004 that is rotated from forward direction 1001 by angle 1006. Meanwhile, however, camera 1003 has been moved to vantage point 1005 and has been rotated to the left by angle 1014. The placement and rotation allow the spectator 1000 to view the player head-on when the player is at position 1012', but also to de-rotate their head when the player moves to position 1012". Angle 1014 is calculated based on angle 1006 and based on the player's predicted near-term path 1010. For example, the yaw-correction function may determine that an angle 1014 results in a de-rotation to the right of angle 1006 when the spectator 1000 follows the player to position 1012".

In FIG. 10C, the player has moved to position 1012" and the spectator 1000 has followed the player to position 1012" with their head and gaze. As a result, the spectator 1000 is facing a direction 1004 that is now aligned with the forward direction 1001. Thus, the yaw-correction function has realigned or re-centered the head of the spectator 1000 to face the forward direction 1001 by identifying the vantage point 1005 as the destination vantage point for the zooming function to move the camera 1003 to, as well as by identifying and rotating the camera 1003 by angle 1014.

While the yaw-correction function has been described with reference to entry into a player portal from an interactable map view, it is noted that the yaw-correction function may also be applied when the player enters into magnifying window.

FIGS. 11A-11D show a timeline of events attendant to entering into a player portal of an interactable map view that is displayed during a third-person view, according to one embodiment. Timeline 1100 shows a contemplated sequence of events occurring before, during, and after a spectator has entered into a player portal view to achieve a new third-person view of a player or other object within the interactive environment. Graph 1101 plots a distance between a vantage point of the spectator and the player against timeline 1100, while graph 1103 plots the translational velocity of the player portal view camera against timeline 1100 and graph 1105 plots the rotational velocity of the player portal view camera against timeline 1100.

At time 1102 on timeline 1100, the third-person view begins when the third-person view camera is provisioned. At time 1104, the spectator selects an interactable map view by, for example, raising a handheld controller in front of the HMD, by pressing down a button on the controller, or by dictating a voice command, etc. In response, a computing device executing the spectator interface provisions a player portal view camera for each player, and, in doing so, the magnified view begins. At time 1106, one of the one or more player portals is enlarged in response to the spectator maintaining their gaze at the player portal. This reveals more of the surroundings of the player. At time 1108, the spectator performs an input to initiate entry into the player portal view. Also, at time 1108, the player portal view camera may begin positional and rotational movement as part of the zooming and yaw-correction functions, although this may also occur after time 1108. During time period 1110, the zooming and yaw-correction functions are executed such that the vantage point of the player portal view is brought closer to the player and that the real-world yaw of the spectator's head and HMD is re-centered. At time 1112, the player portal displaying the player portal begins being wiped away. For example, the player portal may expand to reveal more and more of the player portal view until the player portal view eventually becomes the new third-person view at time 1116. In some embodiments, the player portal may begin being wiped away before the player portal view camera ceases positional and rotational movement. That is, for example, the player portal view camera may continue being brought closer to the player and may continue being rotated about the yaw axis while the player portal is expanding. This gives the appearance that the spectator is being "sucked" into the player portal for the new third-person view. Thus, in some embodiments, the player portal view camera ceases positional and rotational movement anywhere between time 1112 and time 1116, including at time 1116. In other embodiments, the player portal view camera ceases positional and rotational movement at time 1112 when the player portal begins being wiped away. At time 1116, the player portal has been completely wiped away (e.g., it expands until it disappears from view). As such, what was the zoomed and yaw-adjusted player portal view becomes a third-person view of the player. Additionally, when the player portal is completely wiped away at time 1116, the spectator can be said to have been teleported from a vantage point of the original third-person view (e.g., that at time 1102) to the vantage point of the new third-person view (e.g., that at 1116).

Graph 1101 shows plots 1118 and 1120 of distances separating the original third-person view camera and the player portal camera, respectively, from the player along the timeline 1100. Graph 1101 assumes that the player is moving away from the spectator at a constant rate and that the spectator does not manually catch-up to the player. Thus, plot 716 shows that the distance between the player and the spectator experiences a steady increase between time 1102 and time 1116. At time 1116 when the player portal view is wiped away, the new third-person view replaces the original third-person view, and, as a result, plot 1118 ends at time 1116. Plot 1120 illustrates that the distance between the player portal view camera and the player is relatively constant between time 1104 and time 1108. This indicates that the player portal view camera follows the player at a relatively constant distance even as player may be moving away from the third-person view camera. During period 1110, plot 1120 may decrease at a relatively constant rate, indicating that the zooming function moves the player portal view camera at a relatively constant speed. At time 1114, the distance between the player portal view camera and the player reaches a minimum before beginning to increase again after the player portal view camera ceases translational movement. That is, the player starts to move away from the spectator at time 1114. At time 1116, the spectator is said to have completed a teleportation 1107 from the distance of plot 1118 to the distance of plot 1107 at time 1116 when the player portal is completely wiped away.

Graph 1103 plots the translational velocity of the player portal view camera against timeline 1100. In some embodiments, the translational velocity of the player portal view during period 1110 is constant or relatively constant as shown in plots 1122, 1124, and 1126. In other embodiments, the translational velocity may be non-constant as show in plots 1128 and 1130. Other translational velocities may also be utilized with embodiments described here.

Graph 1105 plots the rotational velocity of the player portal view camera against timeline 1100. The rotational velocity refers to the speed at which the player portal view camera is rotated about the yaw axis for yaw-correction (e.g., re-centering the spectator's head and HMD). The rotational velocity may also refer to the speed at which the player portal camera is rotated for pitch-matching and roll-matching functions as well. In some embodiments, the rotational velocity of the player portal view is constant or relatively constant as shown in plots 1132, 1134, and 1136. In other embodiments, the rotational velocity may be non-constant as show in plots 1138 and 1140. Other rotational velocities may also be utilized with embodiments described here.

Figure 12:
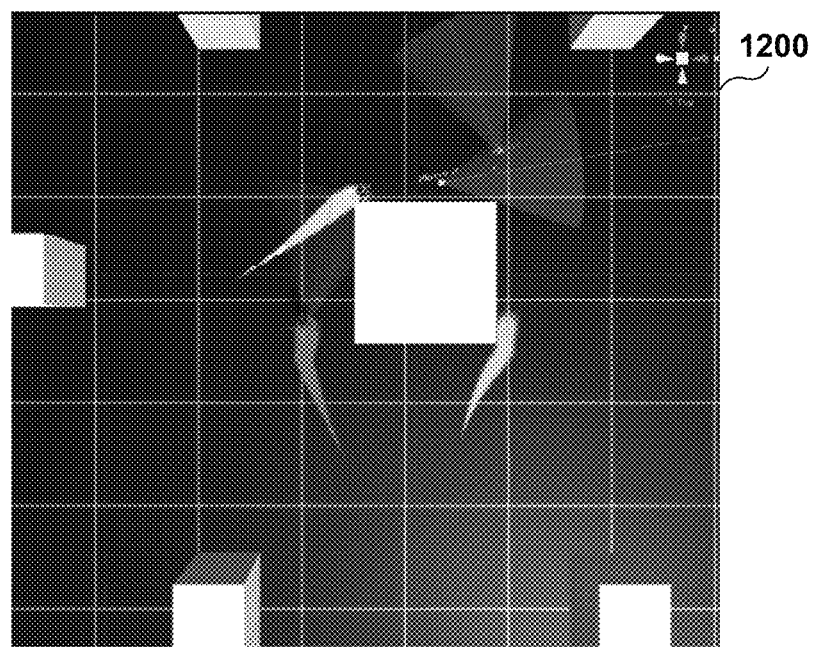
FIG. 12 shows additional features that may be used in conjunction with a map view, according to one embodiment.
Figure 13:
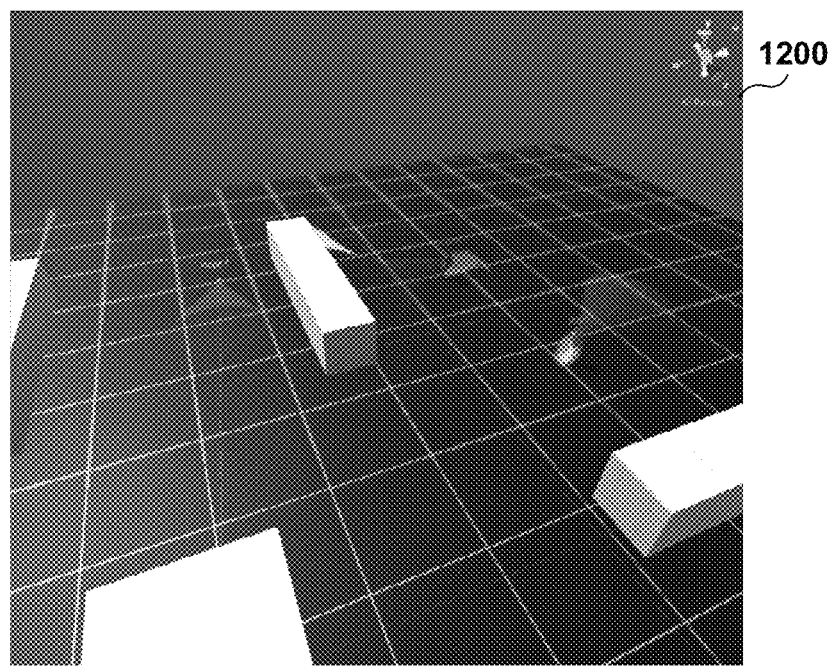
FIG. 13 shows additional features that may be used in conjunction with an overhead view, according to one embodiment.
Figure 14:
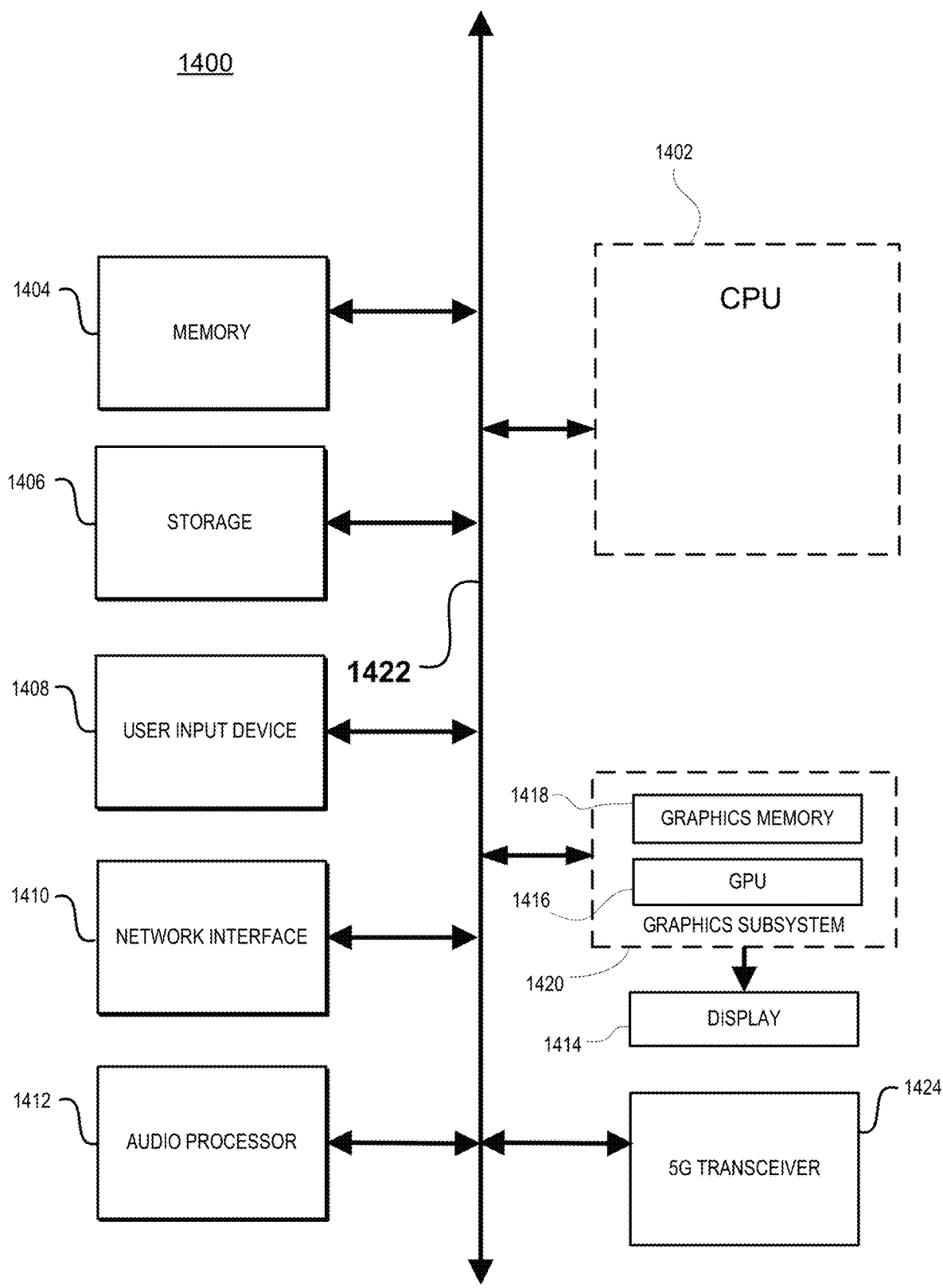
FIG. 14 illustrates components of an example device that can be used to perform aspects of the various embodiments of the present disclosure, according to various embodiments.

FIGS. 13 and 14 illustrate additional features that may be used in conjunction with the embodiments described here. FIG. 12A shows a snapshot 1200 of players interacting within the interactive environment. The snapshot 1200 may be from a map of an interactable map view. Each player is shown with "ghost representation" to communicate to the spectator the players' movement history, e.g., what direction they are coming from, where they have turned, what speed they've traveled at, etc. The "ghost representation" leaves a trail of such information and is configured to have a fading effect so that the spectator can visualize how fresh the data is. Additionally, each player is shown with user knowledge effects, which communicate to the spectator what each player's field of view is and where each player is looking or aiming. FIG. 13 shows similar features of "ghost representations" and user knowledge effects associated with each player from an overhead view.

FIG. 14 illustrates components of an example device 1400 that can be used to perform aspects of the various embodiments of the present disclosure. This block diagram illustrates a device 1400 that can incorporate or can be a head mounted display, a personal computer, video game console, personal digital assistant, a server or other digital device, suitable for practicing an embodiment of the disclosure. Device 1400 includes a central processing unit (CPU) 1402 for running software applications and optionally an operating system. CPU 1402 may be comprised of one or more homogeneous or heterogeneous processing cores. For example, CPU 1402 is one or more general-purpose microprocessors having one or more processing cores. Further embodiments can be implemented using one or more CPUs with microprocessor architectures specifically adapted for highly parallel and computationally intensive applications, such as automated game testing, machine-learning operations, and bug reproduction processes. Device 1400 may be a localized to a player playing a game segment (e.g., game console), or remote from the player (e.g., back-end server processor).

Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to device 1400, examples of which may include keyboards, mice, joysticks, touch pads, touch screens, still or video recorders/cameras, tracking devices for recognizing gestures, and/or microphones. Network interface 1410 allows device 1400 to communicate with other computer systems via an electronic communications network and may include wired or wireless communication over local area networks and wide area networks such as the internet. An audio processor 1412 is adapted to generate analog or digital audio output from instructions and/or data provided by the CPU 1402, memory 1404, and/or storage 1406. The components of device 1400, including CPU 1402, memory 1404, data storage 1406, user input devices 1408, network interface 1410, and audio processor 1412 are connected via one or more data buses 1422. 5G transceiver 1424 allows device 1400 to communicate with 5G digital cellular networks, which provide access to the internet and other networks.

A graphics subsystem 1420 is further connected with data bus 1422 and the components of the device 1400. The graphics subsystem 1420 includes a graphics processing unit (GPU) 1416 and graphics memory 1418. Graphics memory 1418 includes a display memory (e.g., a frame buffer) used for storing pixel data for each pixel of an output image. Graphics memory 1418 can be integrated in the same device as GPU 1416, connected as a separate device with GPU 1416, and/or implemented within memory 1404. Pixel data can be provided to graphics memory 1418 directly from the CPU 1402. Alternatively, CPU 1402 provides the GPU 1416 with data and/or instructions defining the desired output images, from which the GPU 1416 generates the pixel data of one or more output images. The data and/or instructions defining the desired output images can be stored in memory 1404 and/or graphics memory 1418. In an embodiment, the GPU 1416 includes 3D rendering capabilities for generating pixel data for output images from instructions and data defining the geometry, lighting, shading, texturing, motion, and/or camera parameters for a scene. The GPU 1416 can further include one or more programmable execution units capable of executing shader programs.

The graphics subsystem 1420 periodically outputs pixel data for an image from graphics memory 1418 to be displayed on display device 1414. Display device 1414 can be any device capable of displaying visual information in response to a signal from the device 1400, including CRT, LCD, plasma, and OLED displays. Device 1400 can provide the display device 1414 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

Most video games played over the Internet operate via a connection to the game server. Typically, games use a dedicated server application that collects data from players and distributes it to other players. Users access the remote services with client devices, which include at least a CPU, a display and I/O. The client device can be an HMD, PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via an HMD, a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
providing an interface for presenting an overhead view of an interactive environment of a video game on a head mounted display (HMD) of a spectator, the overhead view is associated with a first vantage point for showing one or more players within the interactive environment;
providing a magnifying window within the interface that covers a portion of the overhead view, the magnifying window displays a magnified view of the interactive environment depending on a location of the magnifying window within the interface, the magnified view is associated with a second vantage point that is closer to the interactive environment than the first vantage point is; and
tracking a real-world position of a controller held by the spectator and moving a location of the magnifying window within the interface to correspond to the real-world position of the controller.

2. The method of claim 1, further comprising:
detecting a selection by the spectator for entering a third-person view of a player, the third-person view is associated with a third vantage point that is closer to the player than the first vantage point or the second vantage point; and
moving the second vantage point of the magnifying window to the third vantage point such that a virtual position of the spectator is brought closer to the player within the magnifying window, while the overhead view remains at the first vantage point outside the magnifying window.

3. The method of claim 2, further comprising:
wiping away the magnifying window during at least a portion of said moving the second vantage point, said wiping away the magnifying window includes expanding a size of the magnifying window such that the third-person view replaces the overhead view in the interface.

4. The method of claim 2, wherein the overhead view is associated with a first pitch angle that corresponds to a real-world pitch angle of the HMD and the magnified view is associated with a second pitch angle that differs from the first pitch angle, and wherein the second pitch angle is adjusted to correspond to the first pitch angle during said moving the second vantage point to the third vantage point.

5. The method of claim 1, wherein the magnifying window enables the spectator to view different regions of the interactive environment by a magnification factor of between 1.5× and 10×.

6. The method of claim 2, wherein the third vantage point is identified using a yaw-correction function based on a difference between a real-world rotation of the HMD and a center-facing direction of the HMD and based on a predicted path of the player, and wherein the third vantage point is identified such that the difference between the real-world rotation of the HMD and the center-facing direction is reduced when the spectator follows the player in the third-person view.

7. The method of claim 2, wherein the first vantage point of the overhead view is altitudinally elevated from the interactive environment and the third-person view is altitudinally level with the interactive environment.

8. The method of claim 1, wherein the magnifying window includes a ring structure that surrounds the magnified view that is highlighted, and wherein the overhead view outside the magnifying window is frozen or blurred during said moving the second vantage point.

9. The method of claim 1, further comprising:
selectively providing audio associated with a region of the interactive environment that is being magnified by the magnified window.

* * * * *